United States Patent
Åström et al.

(10) Patent No.: US 12,250,037 B2
(45) Date of Patent: Mar. 11, 2025

(54) BEAMFORMING SETTING SELECTION

(71) Applicant: Telefonaktiebolaget LM Ericsson (publ), Stockholm (SE)

(72) Inventors: Magnus Åström, Lund (SE); Joao Vieira, Hjärup (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 20 days.

(21) Appl. No.: 18/026,372

(22) PCT Filed: Sep. 16, 2020

(86) PCT No.: PCT/EP2020/075851
§ 371 (c)(1),
(2) Date: Mar. 15, 2023

(87) PCT Pub. No.: WO2022/058003
PCT Pub. Date: Mar. 24, 2022

(65) Prior Publication Data
US 2024/0007155 A1   Jan. 4, 2024

(51) Int. Cl.
*H04B 7/06* (2006.01)
*H04B 7/08* (2006.01)
*H04L 25/02* (2006.01)

(52) U.S. Cl.
CPC ......... *H04B 7/0617* (2013.01); *H04B 7/0695* (2013.01); *H04B 7/088* (2013.01); *H04L 25/0224* (2013.01)

(58) Field of Classification Search
CPC .... H04B 7/0617; H04B 7/0695; H04B 7/088; H04B 7/022; H04L 25/0224

(Continued)

(56) References Cited

U.S. PATENT DOCUMENTS

| 8,472,381 B1 | 6/2013 | Lee et al. |
| 2006/0035674 A1* | 2/2006 | Karaoguz ............ H04B 7/0617 455/562.1 |

(Continued)

OTHER PUBLICATIONS

International Search Report and Written Opinion of the International Searching Authority, PCT/EP2020/075851, mailed Jun. 4, 2021, 12 pages.

*Primary Examiner* — Emmanuel Bayard
(74) *Attorney, Agent, or Firm* — Sage Patent Group

(57) ABSTRACT

A beamforming selection method of a first wireless communication node is disclosed. The method includes receiving first reference signaling, transmitted from a second wireless communication node using a first beamforming setting, generating a first channel estimate based on the first reference signaling, and transmitting, using a second beamforming setting, second reference signaling for reception by the second wireless communication node, wherein each coefficient of the second beamforming setting represents a complex conjugate of a corresponding component of the first channel estimate.

In some embodiments, the method further includes iterating the receiving, generating, and transmitting steps until a stopping criterion is met.

For example, the stopping criterion may include that a number of iterations performed equals a maximum number of iterations, and/or that a beamforming convergence criterion is met. Corresponding apparatus, wireless communication node and computer program product are also disclosed.

19 Claims, 6 Drawing Sheets

(58) Field of Classification Search
USPC .......................................... 375/219, 262, 267
See application file for complete search history.

(56) References Cited

U.S. PATENT DOCUMENTS

| | | | |
|---|---|---|---|
| 2010/0056171 A1* | 3/2010 | Ramprashad | H04W 16/10 |
| | | | 455/452.1 |
| 2010/0182198 A1* | 7/2010 | Wen | H04L 25/03961 |
| | | | 342/373 |
| 2010/0215027 A1 | 8/2010 | Liu et al. | |
| 2010/0220811 A1* | 9/2010 | Semenov | H04B 7/0413 |
| | | | 375/295 |
| 2014/0307816 A1* | 10/2014 | Alex | H04L 25/0202 |
| | | | 375/267 |
| 2016/0323894 A1 | 11/2016 | Shen et al. | |
| 2019/0116605 A1 | 4/2019 | Luo et al. | |
| 2019/0199413 A1* | 6/2019 | Sundararajan | H04B 7/0695 |
| 2019/0207661 A1* | 7/2019 | Fröberg Olsson | H04B 17/373 |
| 2020/0091970 A1* | 3/2020 | Lee | H04B 17/336 |
| 2020/0112360 A1 | 4/2020 | Krunz et al. | |
| 2020/0395995 A1* | 12/2020 | Eriksson | H04B 7/0619 |

* cited by examiner

BEAMFORMING SETTING SELECTION

CROSS REFERENCE TO RELATED APPLICATIONS

This application is a 35 U.S.C. § 371 national stage application of PCT International Application No. PCT/EP2020/075851 filed on Sep. 16, 2020, the disclosure and content of which is incorporated by reference herein in its entirety.

TECHNICAL FIELD

The present disclosure relates generally to the field of wireless communication. More particularly, it relates to selection of beamforming settings for wireless communication.

BACKGROUND

Beamforming—for transmission and/or reception—is a well-known tool for improving communication between wireless communication nodes. The beamforming selection (i.e., the process of determining which beamforming setting to use for communication) may include calibration and/or re-calibration of the beamforming setting, which is typically needed (or at least beneficial) to properly enhance transmission/reception performance.

However, existing approaches to beamforming selection may suffer from one or more of the following (or other) drawbacks: inferior accuracy, inferior robustness, and high signaling overhead.

Therefore, there is a need for new beamforming selection approaches.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

Also generally, the term "complex conjugate" may refer to any well-known interpretation (e.g., when a component value has a real part equal to $x_{Re}$ and an imaginary part equal to $x_{Im}$, the complex conjugate of the component value has a real part equal to $x_{Re}$ and an imaginary part equal to $-x_{Im}$.

It is an object of some embodiments to solve or mitigate, alleviate, or eliminate at least some of the above or other disadvantages.

A first aspect is a beamforming selection method of a first wireless communication node. The method comprises receiving first reference signaling, transmitted from a second wireless communication node using a first beamforming setting, generating a first channel estimate based on the first reference signaling, and transmitting—using a second beamforming setting—second reference signaling for reception by the second wireless communication node, wherein each coefficient of the second beamforming setting represents a complex conjugate of a corresponding component of the first channel estimate.

In some embodiments, the method further comprises receiving third reference signaling—transmitted from the second wireless communication node using a third beamforming setting—wherein each coefficient of the third beamforming setting represents a complex conjugate of a corresponding component of a second channel estimate generated based on the second reference signaling as received by the second wireless communication node, generating a third channel estimate based on the third reference signaling, and transmitting—using a fourth beamforming setting—fourth reference signaling for reception by the second wireless communication node, wherein each coefficient of the fourth beamforming setting represents a complex conjugate of a corresponding component of the third channel estimate.

In some embodiments, the method further comprises determining whether a stopping criterion is met, and iterating (until the stopping criterion is met) the steps of receiving further reference signaling—transmitted from the second wireless communication node using a further beamforming setting—wherein each coefficient of the further beamforming setting represents a complex conjugate of a corresponding component of a channel estimate generated based on previously transmitted reference signaling as received by the second wireless communication node, generating a further channel estimate based on the further reference signaling, and transmitting—using an updated beamforming setting— updated reference signaling for reception by the second wireless communication node, wherein each coefficient of the updated beamforming setting represents a complex conjugate of a corresponding component of the further channel estimate.

In some embodiments, the stopping criterion comprises that a number of iterations performed equals a maximum number of iterations, and/or that a beamforming convergence criterion is met.

In some embodiments, the method further comprises transmitting—using a seed beamforming setting—initial reference signaling for reception by the second wireless communication node, wherein receiving the first reference signaling is responsive to transmitting the initial reference signaling and wherein each coefficient of the first beamforming setting represents a complex conjugate of a corresponding component of an initial channel estimate generated based on the initial reference signaling as received by the second wireless communication node.

In some embodiments, the seed beamforming setting comprises one or more of: a beamforming setting previously selected for communication, a randomly selected beamforming setting, and a default beamforming setting.

In some embodiments, the method further comprises receiving final reference signaling (transmitted from the second wireless communication node), generating a final channel estimate based on the final reference signaling, and selecting a beamforming setting for communication, wherein each coefficient of the selected beamforming setting for communication represents a complex conjugate of a corresponding component of the final channel estimate.

In some embodiments, the method further comprises temporarily using a most recent beamforming setting for communication.

In some embodiments, the method further comprises triggering a process comprising the steps of receiving reference signaling (e.g., first, third, further reference signaling) and transmitting reference signaling (e.g., second, fourth, updated reference signaling).

In some embodiments, the triggering is responsive to detecting that a trigger condition is met, wherein the trigger condition comprises one or more of: that a predetermined time duration has elapsed since a previous beamforming selection, that a predetermined point in time for beamforming selection occurs, that a signal quality metric change is indicative of reducing signal quality, and that a signal quality metric falls below a signal quality metric threshold.

In some embodiments, triggering the process comprises transmitting to the second wireless communication node and/or receiving from the second wireless communication node, one or more of: a beamforming selection request message, a beamforming selection grant message, an indication of a number of antenna elements of the first wireless communication node, an indication of a number of antenna elements of the second wireless communication node, an indication of whether the first wireless communication node applies analog or digital beamforming, an indication of whether the second wireless communication node applies analog or digital beamforming, and one or more stopping criteria particulars.

In some embodiments, reference signaling reception is omnidirectional.

In some embodiments, reference signaling transmission using a beamforming setting of the first wireless communication node comprises a single occurrence of reference signaling transmission using the beamforming setting of the first wireless communication node when the second wireless communication node applies digital beamforming.

In some embodiments, reference signaling transmission using a beamforming setting of the first wireless communication node comprises a plurality of occurrences of reference signaling transmissions using the beamforming setting of the first wireless communication node when the second wireless communication node applies analog beamforming.

In some embodiments, the first wireless communication node applies analog beamforming, and reference signaling reception for a beamforming setting of the second wireless communication node comprises receiving reference signaling at a plurality of occurrences—the reference signaling transmitted using the beamforming setting of the second wireless communication node—and transforming the reference signaling received at the plurality of occurrences and/or channel estimates generated based on the reference signaling received at the plurality of occurrences, wherein transforming is based on a representation of a grid of reception beams applied by the first wireless communication node during the plurality of occurrences.

In some embodiments, the first wireless communication node applies analog beamforming, and reference signaling transmission using a beamforming setting of the first wireless communication node comprises magnitude truncation of the beamforming setting.

In some embodiments, the first wireless communication node applies digital beamforming, and reference signaling reception for a beamforming setting of the second wireless communication node comprises receiving reference signaling at a single occurrence—the reference signaling transmitted using the beamforming setting of the second wireless communication node.

In some embodiments, channel estimate generation based on reference signaling comprises interference mitigation.

In some embodiments, the first and second wireless communication nodes are integrated access backhaul (IAB) nodes.

In some embodiments, the first wireless communication node acts as a parent node and the method is performed by a distributed unit (DU) functionality of the first wireless communication node.

In some embodiments, the first wireless communication node acts as a child node and the method is performed by a mobile terminated (MT) functionality of the first wireless communication node.

In some embodiments, the first wireless communication node and/or the second wireless communication node is a stationary deployed network node.

A second aspect is a computer program product comprising a non-transitory computer readable medium, having thereon a computer program comprising program instructions. The computer program is loadable into a data processing unit and configured to cause execution of the method according to the first aspect when the computer program is run by the data processing unit.

A third aspect is a beamforming selection apparatus for a first wireless communication node. The apparatus comprises controlling circuitry configured to cause reception of first reference signaling transmitted from a second wireless communication node using a first beamforming setting, generation of a first channel estimate based on the first reference signaling, and transmission—using a second beamforming setting—of second reference signaling for reception by the second wireless communication node, wherein each coefficient of the second beamforming setting represents a complex conjugate of a corresponding component of the first channel estimate.

A fourth aspect is a beamforming selection apparatus for a first wireless communication node. The apparatus comprises a receiver configured to receive first reference signaling transmitted from a second wireless communication node using a first beamforming setting, a channel estimator configured to generate a first channel estimate based on the first reference signaling, and a transmitter configured to transmit—using a second beamforming setting—second reference signaling for reception by the second wireless communication node, wherein each coefficient of the second beamforming setting represents a complex conjugate of a corresponding component of the first channel estimate.

A fifth aspect is a wireless communication node comprising the apparatus of any of the third or fourth aspects.

In some embodiments, any of the above aspects may additionally have features identical with or corresponding to any of the various features as explained above for any of the other aspects.

An advantage of some embodiments is that new beamforming selection approaches are provided.

An advantage of some embodiments is that improved beamforming selection approaches are provided.

An advantage of some embodiments is that beamforming selection with improved (e.g., increased) accuracy is provided. For example, some embodiments enable exploitation of the available channel more fully than in the prior art.

An advantage of some embodiments is that beamforming selection with improved (e.g., increased) robustness is provided. For example, some embodiments enable use of beamforming patterns exploiting one or more spatial directions for redundancy. This provides robustness, for example, if one spatial direction of the beamforming selection is suddenly rendered inefficient.

An advantage of some embodiments is that beamforming selection is provided with improved (e.g., decreased) signaling overhead. For example, the beamforming selection can be performed using reference signals only, thus avoiding (explicit) feedback procedures.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

In the following, embodiments will be described where new beamforming selection approaches are provided. Various embodiments provide one or more of the following advantages compared to the prior art: improved accuracy, improved robustness, and improved overhead.

An advantage of some embodiments is that new beamforming selection approaches are provided.

An advantage of some embodiments is that improved beamforming selection approaches are provided.

An advantage of some embodiments is that beamforming selection with improved (e.g., increased) accuracy is provided. For example, some embodiments enable exploitation of the available channel more fully than in the prior art.

An advantage of some embodiments is that beamforming selection with improved (e.g., increased) robustness is provided. For example, some embodiments enable use of beamforming patterns exploiting one or more spatial directions for redundancy. This provides robustness, for example, if one spatial direction of the beamforming selection is suddenly rendered inefficient.

An advantage of some embodiments is that beamforming selection is provided with improved (e.g., decreased) signaling overhead. For example, the beamforming selection can be performed more seldom than in the prior art.

Some embodiments are particularly suitable in the context of integrated access backhaul (IAB), which is advocated by the Third Generation Partnership Project (3GPP).

Figure 1:
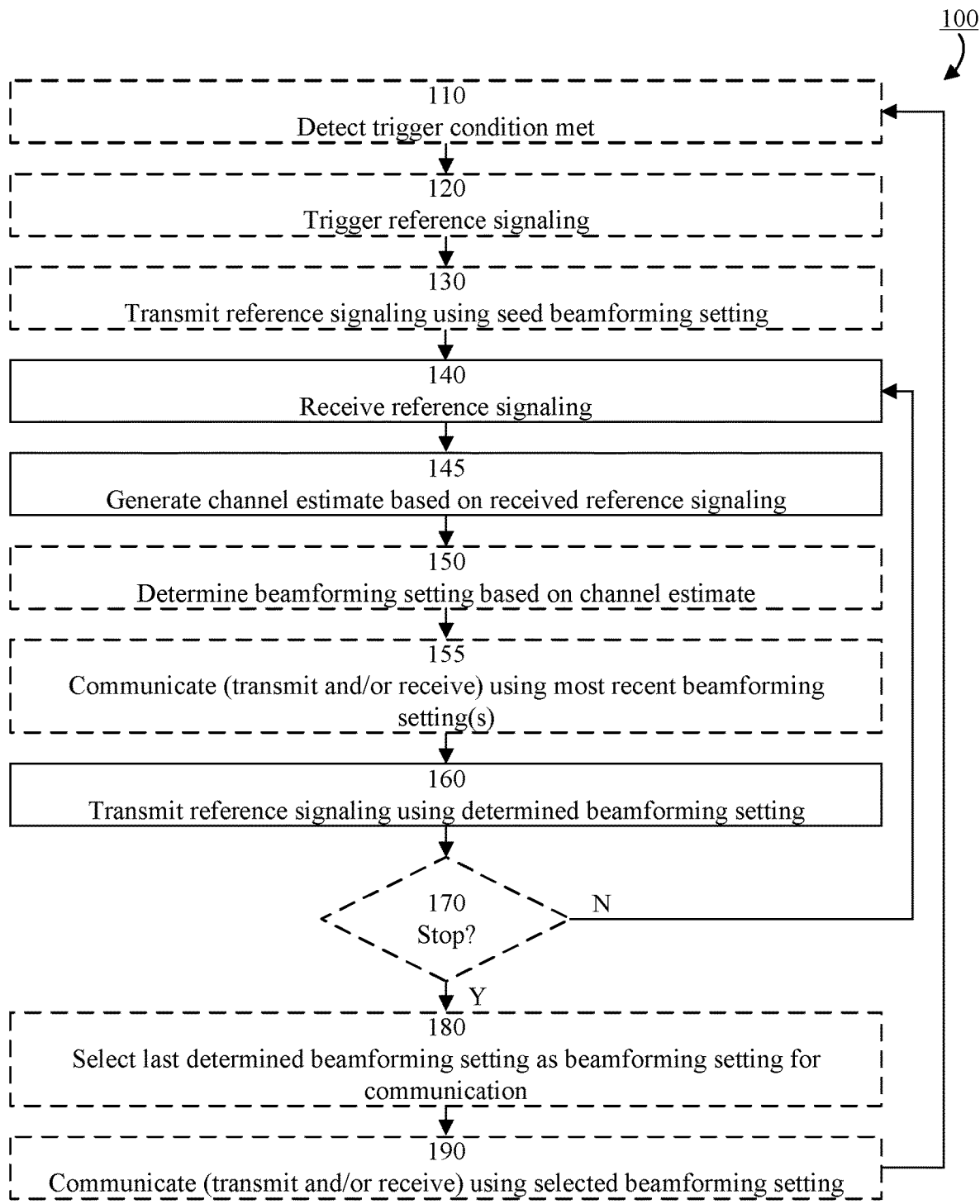
FIG. 1 is a flowchart illustrating example method steps according to some embodiments.

FIG. 1 illustrates an example method 100 according to some embodiments. The method is for beamforming selection and is performed by a first wireless communication node. The method is suitable for selecting a transmission beamforming setting (e.g., a precoder setting) and/or a reception beamforming setting (e.g., a combiner setting) for use by the first wireless communication node in relation to a second wireless communication node.

It should be understood that, in parallel to the method 100 being performed by the first wireless communication node, a corresponding method for beamforming selection may be performed by the second wireless communication node. The corresponding method is suitable for selecting a transmission beamforming setting (e.g., a precoder setting) and/or a reception beamforming setting (e.g., a combiner setting) for use by the second wireless communication node in relation to the first wireless communication node.

The first and/or second wireless communication node may be an IAB node (acting as an IAB parent node or an IAB child node), or any other suitable wireless communication node (e.g., a radio access network node or a user equipment—UE). For example, the first wireless communication node may be an IAB parent node to the second wireless communication node and/or the second wireless communication node may be an IAB child node to the first wireless communication node. Alternatively or additionally, each of the first wireless communication node and the second wireless communication node may be a stationary deployed network node or a mobile (or semi-stationary) network node.

When the first wireless communication node acts as an IAB parent node, the method is typically performed by a distributed unit (DU) functionality of the first wireless communication node. When the first wireless communication node acts as an IAB child node, the method is typically performed by a mobile terminated (MT) functionality of the first wireless communication node.

The beamforming selection enabled by the method 100 is for selection of any suitable (arbitrarily shaped) emission pattern for transmission and/or combining pattern for reception. Thus, a selected beamforming setting may result in an emission/combining pattern corresponding to a single pencil beam, a collection of two or more pencil beams, a non-pencil-like pattern, or any combination thereof.

The method may start by detection that a trigger condition is met as illustrated by optional step 110. For example, the trigger condition may comprise one or more of the following (or other) conditions: that a predetermined time duration has elapsed since a previous beamforming selection, that a predetermined point in time for beamforming selection occurs, that a signal quality metric change is indicative of reducing signal quality, and that a signal quality metric falls below a signal quality metric threshold.

Alternatively or additionally, the trigger condition may comprise that the connection between the first and second wireless communication node is being established (e.g., established for a first time, or re-established after being down, etc.). Examples of trigger conditions of this type include that the first or second wireless communication node acting as an IAB child node performs an initial access operation, or that the first or second wireless communication node has just been configured as IAB node.

Examples of suitable signal quality metrics include, but are not limited to, received signal strength, RSSI (Received Signal Strength Indicator), RSRP (Reference Signal Received Power), RSRQ (Reference Signal Received Quality), SIR (Signal-to-Interference Ratio), SNR (Signal-to-Noise Ratio), SINR (Signal-to-Interference-and-Noise Ratio), etc.

Thus, the trigger condition may enable beamforming selection to be performed at predetermined times (e.g., periodically) and/or responsive to one or more suitable events (such as, e.g., decreased signal quality, connection establishment, etc.).

When it is detected that the trigger condition is met, the method may proceed to optional step 120, where a process is triggered which comprises the—possibly iterated—steps of receiving and transmitting reference signaling as illustrated by steps 140 and 160. Thus, the triggering of step 120 may be responsive to the detection of step 110.

When the triggering of step 120 is responsive to the detection of step 110, step 120 may, for example, comprise transmitting a beamforming selection request message to the second wireless communication node. In some embodiments, step 120 may comprise receiving a beamforming selection grant message from the second wireless communication node (e.g., as a response to the beamforming selection request message). This protocol may be particularly suitable when the first wireless communication node is acting as an IAB child node and the second wireless communication node is acting as an IAB parent node.

Alternatively or additionally, when the triggering of step 120 is responsive to the detection of step 110, step 120 may, for example, comprise transmitting a beamforming selection instruction message to the second wireless communication node. In some embodiments, step 120 may comprise receiving a beamforming selection acknowledgement message from the second wireless communication node (e.g., as a response to the beamforming selection instruction message). This protocol may be particularly suitable when the first wireless communication node is acting as an IAB parent node and the second wireless communication node is acting as an IAB child node.

Alternatively or additionally, step 120 may comprise transmitting (as part of the beamforming selection request message or in a separate message to the second wireless communication node) and/or receiving (as part of the beamforming selection grant message or in a separate message from the second wireless communication node) one or more of: an indication of a number of antenna elements of the first wireless communication node, an indication of a number of antenna elements of the second wireless communication node, an indication of whether the first wireless communication node applies analog or digital beamforming, an indication of whether the second wireless communication node applies analog or digital beamforming, and one or more stopping criteria particulars (e.g., a stopping criteria to be applied, a maximum number of iterations, a beamforming convergence criterion, etc.).

It should be understood that any other information suitable for the beam selection may, additionally or alternatively, be signaled as part of step 120 (e.g., reference signaling particulars such as beam sweep information, number of beams, number of synchronization signal blocks—SSBs—per beam, etc.).

In some embodiments, step 110 is not applicable and the method may be initiated by another node (e.g., the second wireless communication node or a central control node). Then, the method might start in step 120, or directly in step 140, for example.

For IAB, the process is typically—but not necessarily—initiated by an IAB node acting as an IAB parent node. Thus, the method 100 may typically be performed with step 110 in the DU of an IAB parent node, and the method 100 may typically be performed without step 110 in the MT of an IAB child node.

When the method starts in step 120, step 120 may comprise receiving, from the second wireless communication node or from the central control node, a control signal which indicates initiation of the process which comprises the—possibly iterated—steps of receiving and transmitting reference signaling as illustrated by steps 140 and 160.

Alternatively or additionally, step 120 may, for example, comprise receiving a beamforming selection request message from the second wireless communication node or from the central control node. In some embodiments, step 120 may comprise transmitting a beamforming selection grant message to the second wireless communication node or to the central control node (e.g., as a response to the beamforming selection request message).

Alternatively or additionally, step 120 may comprise transmitting and/or receiving any of the other pieces of information as explained above.

When the method starts in step 140, reception of the reference signaling may implicitly indicate initiation of the process which comprises the—possibly iterated—steps of receiving and transmitting reference signaling as illustrated by steps 140 and 160.

When the triggering of step 120 is responsive to the detection of step 110, the method may proceed to optional step 130 after performing step 120. The same may apply for some cases when the method is initiated by another node (e.g., a central control node) and the method starts in step 120. In step 130, initial reference signaling is transmitted using a seed beamforming (i.e., precoding) setting.

The seed beamforming setting may, for example, be a beamforming setting previously selected for communication (e.g., in a previous execution of the method 100), a randomly selected beamforming setting, a default beamforming setting, or any other beamforming setting suitable for the start of the process. A default beamforming setting may, for example, be an omnidirectional beamforming setting, or an adjusted omnidirectional beamforming setting wherein the adjustment comprises one or more enhanced spatial directions (e.g., known or guessed directions, a line-of-sight direction, directions indicated by channel estimates, etc.).

The initial reference signaling transmitted in step 130 is for reception by the second wireless communication node.

The second wireless communication node may generate an initial channel estimate based on the initial reference signaling as received by the second wireless communication node and transmit first reference signaling using a first beamforming setting, wherein each coefficient of the first beamforming setting represents a complex conjugate of a corresponding component of the initial channel estimate. The first reference signaling is received in step 140. Thus, receiving the first reference signaling in step 140 is responsive to transmitting the initial reference signaling in these embodiments.

In other embodiments, step 140 may be performed without first performing step 130 (e.g., for some cases when the method is initiated by the second wireless communication node or a central control node and the method starts in step 120, or directly in step 140). In these embodiments, the first reference signaling and the first beamforming setting may—from the perspective of the second wireless communication node—be seen as initial reference signaling and seed beamforming setting, respectively.

In either case, the method 100 comprises receiving first reference signaling transmitted from the second wireless communication node using a first beamforming setting, as illustrated by step 140. Generally, the reference signal reception of step 140 is preferably performed using a combiner setting which corresponds to an omni-directional—or close to omni-directional—pattern (e.g., a combiner setting corresponding to a collection of discrete Fourier transform DFT beams for the case of linear uniform antenna arrays). Thus, a previously determined or selected beamforming setting should preferably not be used for reference signal reception.

In step 145, a first channel estimate is generated based on the first reference signaling received in step 140. Step 145 may comprise applying any suitable channel estimation approach.

In some embodiments, the channel estimate generation of step 145 comprises interference mitigation. For example, a channel estimation value for a spatial direction corresponding to strong interference may be nulled (or at least suppressed). Knowledge regarding such spatial direction(s) may, for example, be derived by the first wireless communication node when the second wireless communication node is not transmitting; based on channel estimation measurements for the interfering node and/or based on scanning of the received power across different spatial directions. Alternatively or additionally, knowledge regarding such spatial direction(s) may, for example, be received from one or more of: the second wireless communication node, the interfering node, and a central control node.

Then, the method comprises transmitting second reference signaling for reception by the second wireless communication node, as illustrated by step 160. The transmission of the second reference signaling in step 160 is similar to the transmission of the initial reference signaling in step 130, except that a second beamforming setting is used for the transmission of the second reference signaling (instead of the seed beamforming setting used for the transmission of the initial reference signaling).

Each coefficient of the second beamforming setting represents (e.g., corresponds to, is based on, equals, etc.) a complex conjugate of a corresponding component of the first channel estimate. Optional step 150 illustrates that the second beamforming setting may be determined accordingly based on the first channel estimate.

In optional step 170, it is determined whether a stopping criterion is met. When the stopping criterion is not met (N-path out of step 170), the method returns to step 140 for another iteration of steps 140 to 170. When the stopping criterion is met (Y-path out of step 170), the method proceeds to step 180.

The stopping criterion may comprise any suitable criterion, or combination of criteria. For example, the stopping criterion may comprise that a number of iterations performed equals a (e.g., predefined) maximum number of iterations and/or that a beamforming convergence criterion is met. In some embodiments, an initial number of iterations are performed by default, and the stopping criterion is checked in step 170 only thereafter.

Example beamforming convergence criteria include, but are not limited to, that the received reference signaling (or any other suitable metric related thereto) does not change between subsequent iterations, that the received reference signaling (or any other suitable metric related thereto) changes less than some threshold value between subsequent iterations, that the generated channel estimate (or any other suitable metric related thereto) does not change between subsequent iterations, that the generated channel estimate (or any other suitable metric related thereto) changes less than some threshold value between subsequent iterations, that the determined beamforming setting (or any other suitable metric related thereto) does not change between subsequent iterations, and that the determined beamforming setting (or any other suitable metric related thereto) changes less than some threshold value between subsequent iterations.

An example suitable metric for the beamforming convergence criterion is the normalized inner product between subsequently received reference signaling or subsequently generated channel estimates or subsequently determined beamforming settings. For example, the normalization may be based on the Cauchy-Schwarz inequality. The normalization may typically be such that the normalized inner product is between 0 and 1. When the inner product equals 1, it can be interpreted as there being no change between subsequent channel estimates. When the inner product is above a value between 0 and 1 (e.g., 0.8, 0.9, 0.95, 0.99, or any other suitable value), it can be interpreted as there being a change between subsequent channel estimates which is less than some threshold value.

When the stopping criterion is not met (N-path out of step 170), the method returns to step 140 for another iteration of steps 140 to 170, as mentioned above.

Thus, the method 100 may comprise receiving (in step 140) third reference signaling transmitted from the second wireless communication node using a third beamforming setting; similarly as described above for the reception of the first reference signaling. As before, a previously determined beamforming setting (e.g., in step 150 of the previous iteration) should preferably not be used for reference signal reception.

Each coefficient of the third beamforming setting represents a complex conjugate of a corresponding component of a second channel estimate generated based on the second reference signaling as received by the second wireless communication node (compare with steps 140, 145, 150, 160; but performed by the second wireless communication node).

A third channel estimate is generated in step 145 based on the third reference signaling received in step 140; similarly as described above for the generation of the first channel estimate.

Then, fourth reference signaling is transmitted using a fourth beamforming setting in step 160 for reception by the second wireless communication node; similarly as described above for the transmission of the second reference signaling.

Each coefficient of the fourth beamforming setting represents (e.g., corresponds to, is based on, equals, etc.) a complex conjugate of a corresponding component of the third channel estimate. Optional step 150 illustrates that the fourth beamforming setting may be determined accordingly based on the third channel estimate.

After this second iteration, it may (again) be determined whether the stopping criterion is met, as illustrated by step 170. As before, the method returns to step 140 for another iteration of steps 140 to 170 when the stopping criterion is not met (N-path out of step 170), and the method proceeds to step 180 when the stopping criterion is met (Y-path out of step 170).

Hence the method 100 may comprise iterating steps 140 to 170 until the stopping criterion is met. Typically, an initial beamforming calibration between the first and second wireless communication nodes requires, or at least benefits from, that the performed number of iterations is relatively high, while a comparatively lower number of performed iterations may suffice for subsequent adjustments of the beamforming selection between the first and second wireless communication nodes.

Each time the N-path out from step 170 is taken, the method 100 may comprise receiving (in step 140) further (e.g., third, fifth, etc.) reference signaling transmitted from the second wireless communication node using a further (e.g., third, fifth, etc.) beamforming setting; similarly as described above for the reception of the first reference signaling. As before, a previously determined beamforming setting (e.g., in step 150 of the previous iteration) should preferably not be used for reference signal reception.

Each coefficient of the further beamforming setting represents a complex conjugate of a corresponding component of a channel estimate generated based on previously transmitted reference signaling as received by the second wireless communication node.

A further (e.g., third, fifth, etc.) channel estimate is generated in step 145 based on the further reference signaling received in step 140; similarly as described above for the generation of the first channel estimate.

Then, updated (e.g., fourth, sixth, etc.) reference signaling is transmitted using an updated (e.g., fourth, sixth, etc.) beamforming setting in step 160 for reception by the second wireless communication node; similarly as described above for the transmission of the second reference signaling.

Each coefficient of the updated beamforming setting represents (e.g., corresponds to, is based on, equals, etc.) a complex conjugate of a corresponding component of the further channel estimate. Optional step 150 illustrates that the updated beamforming setting may be determined accordingly based on the further channel estimate.

When the stopping criterion is met (Y-path out of step 170), the method proceeds to step 180, as mentioned above. Thus, the further reference signaling received in step 140 of the latest iteration may be termed final reference signaling, and the further channel estimate generated in step 145 of the latest iteration may be termed final channel estimate.

In optional step 180, a beamforming setting is selected for communication, wherein each coefficient of the selected beamforming setting for communication represents a complex conjugate of a corresponding component of the final channel estimate. Thus, the updated beamforming setting determined in step 150 of the latest iteration may be selected for communication.

The selected beamforming may then be used for communication (as precoder setting for transmission and/or as combiner setting for reception), as illustrated in optional step 190. As illustrated by the loop back from step 190 to step 110, the method may optionally be repeated.

In some embodiments, an intermediate—most recent—beamforming setting (e.g., determined in step 150 of a most recent iteration) can be temporarily used for communication that takes place in parallel with the execution of the method 100 (i.e., before the beamforming selection of step 180), as illustrated by optional step 155.

In some embodiments, the determination of step 170 is performed before step 160. In such embodiments, the method proceeds to step 160 and then returns to step 140 for another iteration when the stopping criterion is not met, while the method proceeds to step 180 when the stopping criterion is met. Thus, in these embodiments, step 160 is not performed for the final iteration.

Generally, reference signaling may refer to any signaling suitable for channel estimation measurements. In some embodiments, the reference signaling is suitable for channel estimation measurements over an entire frequency range applicable for the link between the first and second wireless communication node.

The first wireless communication node may apply analog or digital beamforming (for reception and/or transmission). Similarly, the second wireless communication node may apply analog or digital beamforming (for reception and/or transmission). In some examples, the first and second wireless communication nodes both apply digital beamforming. In some examples, the first and second wireless communication nodes both apply analog beamforming. In some examples, the first wireless communication node applies analog beamforming and the second wireless communication node applies digital beamforming. In some examples, the first wireless communication node applies digital beamforming and the second wireless communication node applies analog beamforming.

The execution of the transmission of reference signaling (steps 130 and 160) and the reception of reference signaling (step 140) may typically depend on whether the first and second wireless communication nodes apply analog or digital beamforming, as illustrated by the following examples.

Regardless of whether the first wireless communication node applies analog or digital beamforming, step 160 (and/step 130) may comprise a single occurrence of reference signaling transmission using the beamforming setting of the first wireless communication node when the second wireless communication node applies digital beamforming. A single occurrence is typically sufficient since a digital beamforming receiver typically has several receiver processing paths (e.g., one per antenna element). Thus, the digital beamforming receiver of the second wireless communication node can typically be configured to perform reference signal measurements (e.g., for channel estimation) for all receiver processing paths simultaneously; during the single occurrence.

Regardless of whether the first wireless communication node applies analog or digital beamforming, step 160 (and/step 130) may comprise a plurality of occurrences of reference signaling transmissions using the beamforming setting of the first wireless communication node when the second wireless communication node applies analog beamforming. A plurality of occurrences is typically needed since an analog beamforming receiver typically has only one applicable receiver processing path (or, at least, fewer receiver processing paths than antenna elements). Thus, the analog beamforming receiver of the second wireless communication node can typically not be configured to perform reference signal measurements (e.g., for channel estimation) for all receiver processing paths simultaneously, but typically needs a plurality of occurrences to perform such measurements; e.g., for each (or at least some) of its beams; one at a time. In some embodiments, the plurality corresponds to (e.g., equals, or exceeds) the number of possible beams (i.e., beamforming configurations) of the second wireless communication node.

Regardless of whether the second wireless communication node applies analog or digital beamforming, step 140 may comprise receiving reference signaling (transmitted using the beamforming setting of the second wireless communication node) at a single occurrence when the first wireless communication node applies digital beamforming. A single occurrence is typically sufficient since a digital beamforming receiver typically has several receiver processing paths (e.g., one per antenna element). Thus, the digital beamforming receiver of the first wireless communication node can typically be configured to perform reference signal measurements (e.g., for channel estimation) for all receiver processing paths simultaneously; during the single occurrence.

Regardless of whether the second wireless communication node applies analog or digital beamforming, step 140 may comprise receiving reference signaling (transmitted using the beamforming setting of the second wireless communication node) at a plurality of occurrences when the first wireless communication node applies analog beamforming. A plurality of occurrences is typically needed since an analog beamforming receiver typically has only one applicable receiver processing path (or, at least, fewer receiver processing paths than antenna elements). Thus, the analog beamforming receiver of the first wireless communication node can typically not be configured to perform reference signal measurements (e.g., for channel estimation) for all receiver processing paths simultaneously, but typically needs a plurality of occurrences to perform such measurements; e.g., for one antenna element at a time. In some embodiments, the plurality corresponds to (e.g., equals, or exceeds) the number of antenna elements of the first wireless communication node.

When the first wireless communication node applies analog beamforming, some further processing of the received signals may be applicable according to some embodiments. For example, a transformation may be applied (in addition to other receiver processing) which corresponds to changing the receiver beamforming setting (i.e., the combiner setting) across the plurality of occurrences. Typically—but not necessarily—all reference signaling received during the plurality of occurrences is transformed simultaneously, in a single transformation operation.

The transformation may be based on a representation of a grid of reception beams (i.e., a grid of beamforming settings) applied by the first wireless communication node during the plurality of occurrences. For example, the beamforming settings may represent discrete Fourier transform beams or beams corresponding to a Grassmannian space.

Additionally or alternatively, the transformation may be represented by a matrix B, wherein each row represents a receiver beamforming setting at a particular occurrence. For example, the matrix B may be a discrete Fourier transform matrix or a Grassmanian matrix.

In some embodiments, the transformation is part of step 145. Thus, in some embodiments step 145 may comprise—before channel estimation—transforming the reference signaling received at the plurality of occurrences. Alternatively or additionally, step 145 may comprise—after channel estimation—transforming the channel estimates generated based on the reference signaling received at the plurality of occurrences.

In some embodiments, the transformation is part of step 150. Thus, in some embodiments step 150 may comprise—before determining the beamforming setting—transforming the channel estimates generated based on the reference signaling received at the plurality of occurrences.

When the first wireless communication node applies analog beamforming, some further processing of the received signals may be applicable according to some embodiments (additionally or alternatively to the transformation). For example, the reference signaling and/or the beamforming setting may be truncated for transmission. Thus, in some embodiments step 150 and/or 160 may comprise magnitude truncation of the beamforming setting to be used in the reference signaling transmission. Alternatively or additionally, in some embodiments step 160 may comprise magnitude truncation of the reference signaling to be transmitted.

Figure 2:
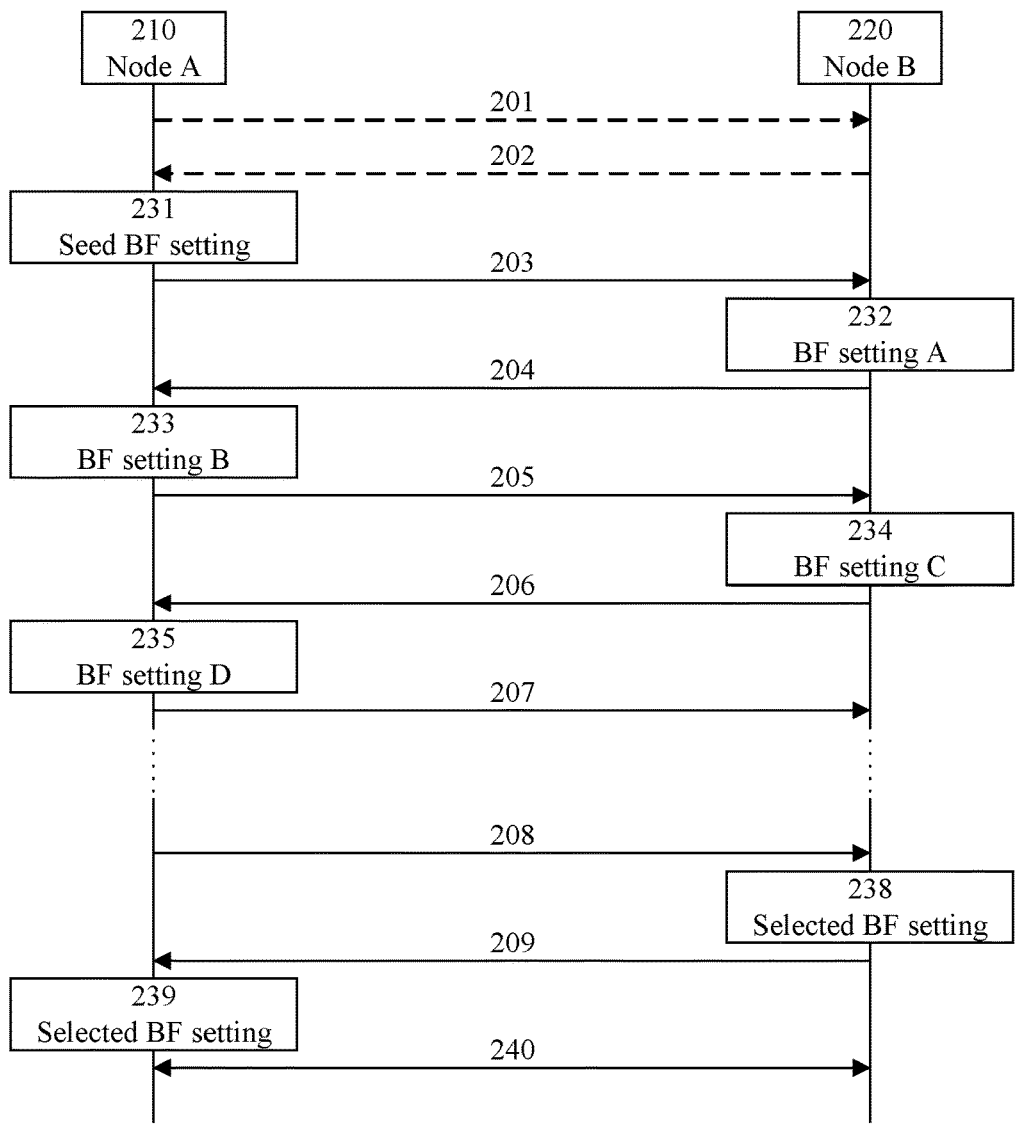
FIG. 2 is a signaling diagram illustrating example signaling according to some embodiments.

FIG. 2 illustrates example signaling between a Node A 210 and a Node B 220, according to some embodiments. For example, Node A may be acting as an IAB parent node and Node B may be acting as an IAB child note, or vice versa.

In some embodiments, Node A may correspond to the first wireless communication node and Node B may correspond to the second wireless communication node; as referred to above in the context of FIG. 1. Alternatively, Node B may correspond to the first wireless communication node and Node A may correspond to the second wireless communication node; as referred to above in the context of FIG. 1. Thus, either of Node A and Node B may be configured to perform one or more steps of the method 100 of FIG. 1. In some embodiments, both Node A and Node B are configured to perform one or more steps of respective instantiations (A and B) of the method 100 of FIG. 1. Generally, it should be noted that any feature described above in the context of FIG. 1 may be equally applicable to the context of FIG. 2, even if not explicitly repeated.

The signaling may optionally start with control signaling between Node A and Node B. As exemplified in FIG. 2, Node A may trigger reference signaling by transmission of a beamforming selection request message 201 (compare with step 120 of instantiation A of the method 100) to be received by Node B (compare with step 120 of instantiation B of the method 100). In some embodiments, Node B responds by transmission of a beamforming selection grant message 202 (compare with step 120 of instantiation B) to be received by Node A (compare with step 120 of instantiation A). In some embodiments, 202 is omitted and Node A proceeds directly to reference signaling. For example, the message 201 may comprise Node A configurations (particularly if Node A is an IAB parent node) and the message 202 may comprise Node B capabilities (particularly if Node B is an IAB child node).

Generally, information comprised in the messages 201 and/or 202, may be provided by one or more of: signaling from Node A to Node B (as illustrated in FIG. 2), signaling from Node B to Node A (as illustrated in FIG. 2), signaling from a central control node to either or both of Node A and Node B, and signaling from an IAB donor node (possibly via other IAB nodes) to either or both of Node A and Node B. Alternatively or additionally, information comprised in the messages 201 and/or 202 may be pre-determined and stored in one or more of: Node A, Node B, another IAB node, an IAB donor node, and a central control node.

In this initial phase, a suitable parameterization for running the iterative procedure can be established (e.g., via exchange of IAB parent configurations and IAB child capabilities). Such a parameterization may, for example, refer to one or more of: a maximum number of iterations, an amount of beam training used within an iteration (e.g., a number of antenna elements or receiver processing paths of an analog beamforming node, and/or a number of occurrences of reference signaling transmission to an analog beamforming node), a threshold value for a convergence criterion, and the convergence criterion itself (e.g., normalized inner product). Alternatively or additionally, the parameterization may involve more fundamental configurations (e.g., number of transmitted SSB beams, analog or digital beamforming capabilities, number of parallel beams to transmit or receive, etc.).

After any such parameterization is established (if applicable), the iterative procedure (the reference signaling phase) may takes place.

In the reference signaling phase, Node A starts by using a seed beamforming (BF) setting, as illustrated at 231, to transmit initial reference signaling 203 (compare with step 130 of instantiation A). The initial reference signaling 203 is received by Node B (compare with step 140 of instantiation B).

In the first iteration, Node B determines a beamforming setting A, as illustrated at 232 (compare with steps 145 and 150 of instantiation B), and uses it to transmit first reference signaling 204 (compare with step 160 of instantiation B). The first reference signaling 204 is received by Node A (compare with step 140 of instantiation A). Then, Node A determines a beamforming setting B as illustrated at 233 (compare with steps 145 and 150 of instantiation A), and uses it to transmit second reference signaling 205 (compare with step 160 of instantiation A). The second reference signaling 205 is received by Node B (compare with step 140 of instantiation B).

In the second iteration, Node B determines a beamforming setting C, as illustrated at 234 (compare with steps 145 and 150 of instantiation B), and uses it to transmit third reference signaling 206 (compare with step 160 of instantiation B). The third reference signaling 206 is received by Node A (compare with step 140 of instantiation A). Then, Node A determines a beamforming setting D as illustrated at 235 (compare with steps 145 and 150 of instantiation A), and uses it to transmit fourth reference signaling 207 (compare with step 160 of instantiation A). The fourth reference signaling 207 is received by Node B (compare with step 140 of instantiation B).

In each iteration, Node B determines an updated beamforming setting based on further reference signaling received by Node B, and uses it to transmit updated reference signaling. The updated reference signaling is received as yet further reference signaling by Node A. Then, Node A determines a yet updated beamforming setting based on the yet further reference signaling, and uses it to transmit yet updated reference signaling. The yet updated reference signaling is received by Node B, and so on.

The reference signaling is iterated until a stopping criterion is met (compare with step 170). The stopping criterion may be checked in either or both of Node A and Node B.

In an example final iteration (when the stopping criterion is met), Node B determines a beamforming setting—which also becomes the selected BF setting for Node B (compare with step 180 of instantiation B)—based on received reference signaling 208, as illustrated at 238. Node B uses it to transmit final reference signaling 209. The final reference signaling 209 is received by Node A. Then, Node A determines a final beamforming setting—which also becomes the selected BF setting for Node A (compare with step 180 of instantiation A)—as illustrated at 239.

The selected beamforming settings 238, 239 are thereafter used as precoder settings and/or combiner settings for communication 240 between Node A and Node B.

Thus, in the reference signal phase, Node A and Node B (e.g., an IAB parent node and an IAB child node) transmit reference signaling back-and-forth in order for each of them to compute its own beamforming setting. Example reference signaling applicable for this purpose includes NR channel state information reference signals (CSI-RS), NR sounding reference signals (SRS), demodulation reference signals (DMRS), phase tracking reference signals (PTRS), and new reference signals particularly dedicated for this purpose.

Some embodiments of the beamforming selection approach will now be further exemplified.

For illustrative (but non-limiting) purposes, the following link setup is assumed: an IAB parent node with a fully digital M-antenna array (i.e., one transceiver processing chain per antenna element), and an IAB child node with an analog K-antenna array (i.e., a single transceiver processing chain for the entire antenna array—at least for radio frequency processing—and beamforming via an analog phase-shift per antenna element). It should be noted that this is merely an example, and the principles of embodiments are equally applicable when, for example, both nodes are analog beamforming nodes, both nodes are fully digital beamforming nodes, or one or more of the two nodes is a hybrid (partly analog, partly digital) beamforming node. The channel between the parent node and the child node is assumed to be reciprocal and time-invariant (or varying very slowly, as is typical in IAB scenarios). The proposed approaches provide a procedure for finding a suitable pair of beamforming settings for the parent node and the child node. As mentioned before, it should be noted that the beamforming setting can correspond to a beamforming pattern of arbitrary shape; it does not necessarily need to be a pencil beam.

At each end of the link, the beamforming construction at each iteration is typically closely related to computing the complex conjugate of previously received reference signaling. In hardware, computation of the complex conjugate for a sample of the received reference signaling may be realized through a simple bit flip for the imaginary component of the sample. Thus, this operation can be implemented almost instantaneously.

The iterative procedure may be implemented as follows according to some embodiments. Let the K×1 column vector $y^*_{CN}(0)$, and the M×1 column vector $y^*_{PN}(0)$, denote initial guesses for the child node beam and the parent node beams, respectively, at iteration 0. This may correspond to seed beamforming settings. In some embodiments, only one of the nodes need to apply an initial guess; the one transmitting the staring instance of reference signaling using seed beamforming settings. Each entry of the vectors corresponds to the complex-valued beamforming coefficient applied at each antenna. The initial guesses can be set via prior information if available, or randomly, for example. Then, at iteration n, where n≥1, the following steps may be performed (corresponding to the initial reference signaling being transmitted from the child node):

1. The child node adjusts the phases of its analog front-ends and transmits the complex conjugated version of the entries of $y_{CN}(n-1)$ with truncated magnitudes, i.e., $\exp(-j2\pi \arg(y_{CN}(n-1)))$, (compare with step 160 (and 130) for child node instantiation of FIG. 1).

2. The signals from the child are received at the parent node $y_{PN}(n)$ (compare with step 140 for parent node instantiation of FIG. 1), and the parent node transmits using a precoder that equals the complex-conjugated version of the beam associated with the received signals, namely the column vector $y*_{PN}(n)$ for K' consecutive timeslots (compare with step 160 for parent node instantiation of FIG. 1).
3. For each of the K' timeslots of Step 2, the child node listens to each of the received signals (compare with step 140 for child node instantiation of FIG. 1), one by one in each of its configured beams. The signal received at the k'th timeslot, with 1≤k'≤K', is obtained by multiplying the received signal at the child node's K antennas, say the K×1 column vector y(k'), with the k'th row of a K'×K grid-of-beams matrix B. This may correspond to transformation as elaborated in earlier herein. After the K' receptions, the K' received samples (one per reception) are stacked and the child node obtains the column vector ỹ(n)=diag(B[y(1) ... y(K')]).
4. In the digital domain, the child node estimates the grid-of-beams-equalized received signal vector. For example, the child node may compute it as $y_{CN}(n)=B^+$ ỹ(n), where $B^+$ is the pseudo inverse matrix of B.
5. Go to Step 1 if a converge criterion was not met (compare with step 170 for child node instantiation of FIG. 1). For example, meeting the convergence criterion may comprise reaching a pre-defined maximum number of iterations and/or there being no significant beamforming changes from one iteration to the next (e.g., $y_{PN}^T(n)y*_{PN}(n-1)/\sqrt{\|y_{PN}(n)\|^2 \|y_{PN}(n-1)\|^2} < \delta_1$, where $\delta_1$ is a pre-defined threshold).
6. If the converge criterion was met, use the thus obtained parent node beamforming setting, $b_{PN}=y*_{PN}(n)$, and child node beamforming setting, $b_{CN}=\tau(y_{CN}(n))* \triangleq \exp(-j2\pi \arg(y_{CN}(n)))$, for data transmission and/or reception.

Generally, each iteration of the disclosed approaches should preferably improve, or at least maintain, the effective link margin (which is directly related to throughput). The following exemplifies that such convergence may be achieved in the context referred to above.

For simplicity, narrow band operation is assumed, and that the grid-of-beams matrix B is a (square) DFT matrix.

After iteration n+1, the parent node beam is given by $b_{PN}(n+1)=\tau(H^T(Hb_{PN}(n))*)*=\tau(H^H Hb_{PN}(n))$, where $b_{PN}(n)$ denotes the parent node beam after iteration n, $\tau(z(n))* \triangleq \exp(-j2\pi \arg(z(n)))$ defines truncation, and H is a narrowband matrix multiple-input multiple-output (MIMO) propagation channel between the child and parent nodes.

The expression $\tau(H^T(Hb_{PN}(n))*)*$ results from the beam $b_{PN}(n)$ being sent from the parent node over the propagation channel to obtain $Hb_{PN}(n)$, which is received in the grid-of-beams matrix of the child node to obtain $BHb_{PN}(n)$. Then, the grid-of-beams matrix is equalized to obtain $B^{-1}BHb_{PN}(n)=Hb_{PN}(n)$, and the complex conjugate of the received signals is taken to obtain $(Hb_{PN}(n))*$ at the child node. Then, this signal is sent to the parent node over the channel to obtain $H^T(Hb_{PN}(n))*$, and the new beamforming setting is given by truncating the complex conjugated version of the received signals to obtain $\tau(H^T(Hb_{PN}(n))*)*$.

To prove convergence of the iterative procedure, it suffices to show that every iteration always improves, or at least maintains, the received energy at either of the nodes, i.e., that $\|Hb_{PN}(n+1)\|^2 - \|Hb_{PN}(n)\|^2 \geq 0$. The left-hand side may be expanded as $$\|Hb_{PN}(n+1)\|^2 - \|Hb_{PN}(n)\|^2 ==$$

$$(b_{PN}(n+1))^H H^H H b_{PN}(n+1) - (b_{PN}(n))^H H^H H b_{PN}(n) ==$$

$$(b_{PN}(n+1) - b_{PN}(n))^H H^H H (b_{PN}(n+1) - b_{PN}(n)) + +2\Re$$

$$\{(b_{PN}(n+1))^H H^H H b_{PN}(n)\} == (b_{PN}(n+1) - b_{PN}(n))^H H^H$$

$$H(b_{PN}(n+1) - b_{PN}(n)) + +2\Re\{\tau(H^H H b_{PN}(n))^H H^H H b_{PN}(n)\}.$$

Since $H^H H$ is positive semi-definite, it follows by definition that the first term of the above expression is always greater than, or equal to, zero. The second term of the above expression is also always greater than, or equal to, zero, since it corresponds to an inner product between two vectors with symmetric phases; $\tau(H^H Hb_{PN}(n))^H$ and $H^H Hb_{PN}(n)$. Thereby, it follows that $\|Hb_{PN}(n+1)\|^2 - \|Hb_{PN}(n)\|^2 \geq 0$, which shows convergence for the approach in that each iteration either improves, or maintains, the effective link margin.

Regarding the number of iterations needed for convergence, example Monte Carlo simulations show that two iterations may be sufficient to harvest most of the beamforming gains in a large number of channels models, and that, once the method converges, one iteration (performed rather seldomly) may—due to the static nature of IAB channels—be enough to re-adjust the beamforming pair.

Regarding link redundancy and robustness, it may be stressed that—after convergence—the resulting beamforming pair generally has arbitrary structure; potentially very different than DFT-like beamforming. Thus, only a fraction of the energy is typically radiated towards, and/or received from, each of many possible channel paths; thereby providing redundancy. This is beneficial for link robustness since, if one such channel path is suddenly blocked and/or if another channel path arises, the link will still be comparatively stable until re-calibration of the beamforming is performed.

It should be noted that, generally, some embodiments give better link margins compared to using properly locked DFT-beams at both ends of the link, since they inherently exploit all propagation paths of the channel (unlike illuminating a single cluster as in DFT-beamforming) which improves the resulting link margin.

All beamforming adjustments in the iterative procedure may be entirely carried out using only existing reference signaling (e.g., uplink/downlink DMRS, CSI-RS, SRS, etc.). Thus, there may potentially be a reduction of overhead in terms of beamforming configuration reports compared to beam management procedures according to NR, where explicit feedback on beam measurements take place.

Regarding measurement overhead, the K'×K grid-of-beams matrix B typically has unit-magnitude entries due to the analog nature of the child node beamformer. The choice of B is possible from a large variety of matrices. For example, B can be a DFT matrix when K'=K, corresponding to a full beam sweep, which may not be a problem in static IAB channels. However, if a compromise needs to be obtained, the number of reference signaling transmissions may be reduced, K'<K, and $B^T$ can be set to a Grassmanian matrix (i.e., one of the Non-Orthogonal Multiple Access, NOMA, matrices). This captures most of the antenna space with reduced overhead, and performance close to that of a DFT matrix is achieved with reduced training overhead.

In some embodiments, the procedure may require coordination between the nodes, for example, in the sense that they can be beamformed with the complex conjugate of previously received signals. If not standardized, the nodes simply have an (explicit or implicit) agreement to follow the procedure elaborated on above. If standardized, the signaling required fits within the NR beamforming framework, which the adjustment of—in addition to transmitting with the same angular energy pattern that the node previously received—an additional phase requirement (namely, that the node also transmits with phase differences opposite to those it previously received; in the directions of the main channel paths).

The approach above is inherently suitable for single carrier narrowband systems (e.g., a subcarrier of an OFDM system).

In the case of a fully digital node, the approach is rather simply extendable to multicarrier cases, since the node can then carry out the procedure on a per-subcarrier basis (by flipping the sign of the imaginary part of the signals received in each subcarrier).

To extend the functionality of an analog node to multicarrier cases, some more adjustment is needed since the analog node should preferably find the best phase-shifts (one per antenna) for all subcarriers. If the analog node would only be constrained to use the same complex-valued weight (and not constrained to use difference weights with same magnitude) for all subcarriers, then the solution would be a wideband beamforming setting $b_{WB}$ corresponding to the dominant eigendirection across the entire bandwidth.

However, when the analog node is also constrained to use equal-energy beamforming weights (as in phase-based analog beamforming), it should preferably find a phase-based vector that is close enough to $b_{WB}$. Denoting e as a vector with equal-valued entries and variable phases, the optimization problem may be expressed as maximizing the alignment between these two vectors; i.e., max $(|b_{WB}^H e|/\sqrt{b_{WB}^H b_{WB} e^H e})$. The vector that maximizes the expression and solves the optimization problem is $\hat{e} = \exp(j2\pi \arg(b_{WB}))$. Thus, the analog node may first calculate the dominant eigendirection across the bandwidth for the received reference signaling, and then set the beamforming using only the phases of the corresponding dominant eigenvector. The dominant singular vector can be conveniently tracked over time (e.g., using a power iteration method) due to the slow time-varying nature of IAB channels. To conclude, step 4 from the procedure above can be modified for the case of multicarrier systems to:

4. In the digital domain, the child node estimates the grid-of-beams-equalized received signal vector. For example, the child node may compute it as $y'_{CN}(n)=B^+ \tilde{y}(n)$, where $B^+$ is the pseudo inverse matrix of B. When the child node measures these signals for each subcarrier (or for a set of subcarriers representative of the entire bandwidth) the received signal vector also has a dependency on frequency, $f$, namely $y'_{CN}(n, f)$, with $1 < f < F$. The child node may then compute the dominant left singular vector, u, from the matrix $[y'_{CN}(n, 1) \ldots y'_{CN}(n, F)]$ and set $y_{CN}(n)=u$. (Phase truncation can be performed at step 1 or at step 6.)

Figure 3:
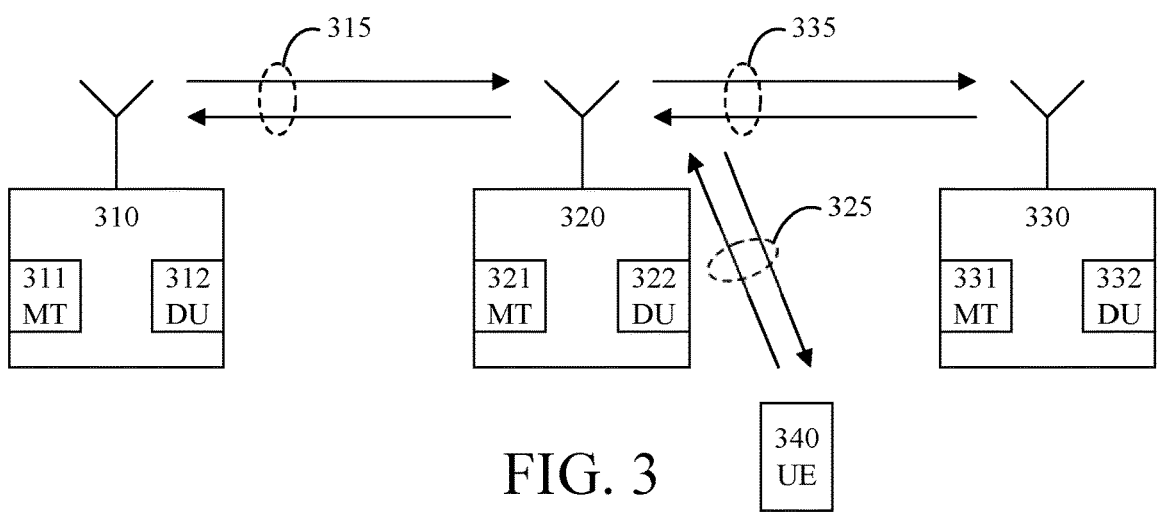
FIG. 3 is a schematic drawing illustrating example communication nodes according to some embodiments.

As mentioned above, some embodiments are particularly suitable for IAB contexts. FIG. 3 schematically illustrates example IAB communication nodes 310, 320, 330 according to some embodiments. Generally, any one of the IAB communication nodes 310, 320, 330 may be a stationary deployed network node or a mobile (or semi-stationary) network node. Alternatively or additionally, any one of the IAB communication nodes 310, 320, 330 may be configured to perform one or more steps of a respective instantiation of the method 100 of FIG. 1.

The wireless communication link 315 is an IAB link between node 310 and node 320. From the perspective of the node 320, the link 315 may be seen as an upstream backhaul link. In relation to the link 315, node 310 uses the distributed unit (DU) 312 to act as an IAB parent node to node 320 and node 320 uses the mobile terminated (MT) 321 to act as an IAB child node to node 310.

Similarly, the wireless communication link 335 is an IAB link between node 320 and node 330. From the perspective of the node 320, the link 335 may be seen as a downstream backhaul link. In relation to the link 335, node 320 uses the distributed unit (DU) 322 to act as an IAB parent node to node 330 and node 330 uses the mobile terminated (MT) 331 to act as an IAB child node to node 320.

Generally, there may be any suitable number of IAB links 315, 335 between corresponding IAB nodes 310-320, 320-330; thereby creating an IAB chain by use of the DU 312, 322, 332 and MT 311, 321, 331 of each IAB node.

The IAB node at one end of the IAB chain may be a so called donor node, which—instead of acting as an IAB child node through an MT—has a wired backhaul connection.

Establishment and/or maintenance of one or more of the IAB links may comprise one or more of the corresponding IAB nodes performing one or more steps of a respective instantiation of the method 100 of FIG. 1.

Any IAB node in the IAB chain may also be configured to communicate (e.g., using the DU) with one or more user equipment (UE) 340 using a suitable communication link 235. From the perspective of the node 320, the link 325 may be seen as a radio access link associated with the UE 340.

Figure 4:
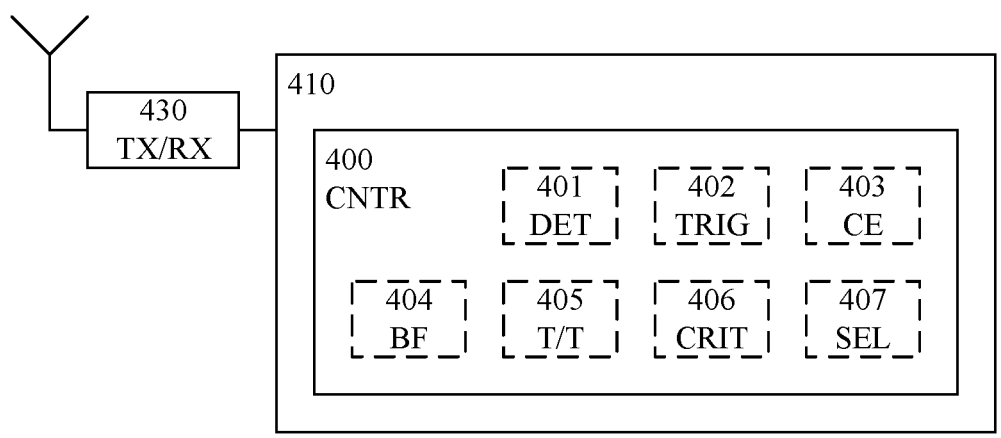
FIG. 4 is a schematic block diagram illustrating an example apparatus according to some embodiments.

FIG. 4 schematically illustrates an example apparatus 410 according to some embodiments. The apparatus is for beamforming selection and is comprisable (e.g., comprised) in a first wireless communication node. The apparatus is suitable for selecting a transmission beamforming setting (e.g., a precoder setting) and/or a reception beamforming setting (e.g., a combiner setting) for use by the first wireless communication node in relation to a second wireless communication node.

For example, the apparatus 410 may be configured to perform, or cause performance of, one or more steps of the method 100 of FIG. 1. Generally, it should be noted that any feature described above in the context of FIG. 1 may be equally applicable—mutatis mutandis—to the context of FIG. 4, even if not explicitly repeated.

The first wireless communication node may be an IAB node (acting as an IAB parent node or an IAB child node), or any other suitable wireless communication node (e.g., a radio access network node or a user equipment—UE).

When the first wireless communication node acts as an IAB parent node, the apparatus is suitable for inclusion in, or association with, a distributed unit (DU) functionality of the first wireless communication node. When the first wireless communication node acts as an IAB child node, the apparatus is suitable for inclusion in, or association with, a mobile terminated (MT) functionality of the first wireless communication node.

The apparatus 410 comprises a controller (CNTR; e.g., controlling circuitry or a control module) 400.

The controller 400 is configured to cause reception of reference signaling, transmitted from a second wireless communication node using a beamforming setting (compare with step 140 of FIG. 1). As explained and exemplified in connection with FIG. 1, reference signaling reception may be at a single occurrence or at a plurality of occurrences; depending on whether the first wireless communication node applies analog or digital beamforming.

To this end, the controller 400 may comprise, or be otherwise associated with (e.g., connected, or connectable, to) a receiver (RX; e.g., receiving circuitry or a reception module—illustrated in FIG. 4 as part of a transceiver 430). The receiver may be configured to receive the reference signaling.

The controller 400 is also configured to cause generation of a channel estimate based on the received reference signaling (compare with step 145 of FIG. 1).

To this end, the controller 400 may comprise, or be otherwise associated with (e.g., connected, or connectable, to) a channel estimator (CE; e.g., channel estimating circuitry or a channel estimation module) 403. The channel estimator may be configured to generate the channel estimate based on the received reference signaling.

The controller 400 is also configured to cause transmission, using a beamforming setting, of reference signaling for reception by the second wireless communication node (compare with steps 130 and 160 of FIG. 1). As explained and exemplified in connection with FIG. 1, reference signaling transmission take place at a single occurrence or at a plurality of occurrences; depending on whether the second wireless communication node applies analog or digital beamforming.

To this end, the controller 400 may comprise, or be otherwise associated with (e.g., connected, or connectable, to) a transmitter (TX; e.g., transmitting circuitry or a transmission module—illustrated in FIG. 4 as part of a transceiver 430). The transmitter may be configured to transmit the reference signaling Each coefficient of the transmission beamforming setting may represent a complex conjugate of a corresponding component of the channel estimate as explained above in connection to FIG. 1. The controller 400 may also be configured to cause determination of the beamforming setting based on the channel estimate (compare with step 150 of FIG. 1).

To this end, the controller 400 may comprise, or be otherwise associated with (e.g., connected, or connectable, to) a beamformer (BF; e.g., beamforming circuitry or a beamform module) 404. The beamformer may be configured to determine the beamforming setting based on the channel estimate.

The controller 400 may also be configured to cause determination of whether a stopping criterion is met (compare with step 170 of FIG. 1), and iteration, as elaborated on above, until the stopping criterion is met.

To this end, the controller 400 may comprise, or be otherwise associated with (e.g., connected, or connectable, to) a criterion checker (CRIT; e.g., criterion checking circuitry or a criterion check module) 406. The criterion checker may be configured to determine whether the stopping criterion is met.

The controller 400 may also be configured to cause selection of a beamforming setting for communication (compare with step 180 of FIG. 1).

To this end, the controller 400 may comprise, or be otherwise associated with (e.g., connected, or connectable, to) a selector (SEL; e.g., selecting circuitry or a selection module) 407. The selector may be configured to select the beamforming setting for communication.

The controller 400 may also be configured to cause triggering of the process comprising the steps of receiving and transmitting reference signaling (compare with step 120 of FIG. 1).

To this end, the controller 400 may comprise, or be otherwise associated with (e.g., connected, or connectable, to) a triggerer (TRIG; e.g., triggering circuitry or a trigger module) 402. The triggerer may be configured to trigger the process.

The controller 400 may also be configured to cause detection that a trigger condition is met (compare with step 110 of FIG. 1), and perform the triggering in response thereto.

To this end, the controller 400 may comprise, or be otherwise associated with (e.g., connected, or connectable, to) a detector (DET; e.g., detecting circuitry or a detection module) 401. The detector may be configured to detect that the trigger condition is met.

The controller 400 may also be configured to cause (e.g., when the first wireless communication node applies analog beamforming) one or more of: transformation of the received reference signaling received and/or the generated channel estimates, and magnitude truncation of the beamforming setting and/or the reference signals, as described in connection to FIG. 1).

To this end, the controller 400 may comprise, or be otherwise associated with (e.g., connected, or connectable, to) a transformer and/or truncator (T/T; e.g., transforming/truncating circuitry or a transformation/truncation module) 405. The transformer may be configured to transform the received reference signaling received and/or the generated channel estimates. The truncator may be configured truncate the beamforming setting and/or the reference signals.

Application of some embodiments will now be elaborated on by exemplification in the context of IAB beam calibration.

In 3GPP there is a Work Item (WI) for Integrated Access Backhaul (IAB) based on an earlier study item documented in 3GPP technical report (TR) 38.874. One purpose of IAB is to enable replacement of existing wired backhaul. One purpose of IAB is to enable flexible wireless backhaul using the existing 3GPP frequency bands; providing wireless backhaul as well as cellular services by the same node. One purpose of IAB is to reduce the cost for backhaul (wired backhaul can in some deployments impose a large cost for the installation and operation of a radio access node).

Typically, the IAB donor node is the only node of the IAB chain connected to a wired backhaul, and each IAB node in the chain of nodes acts as child node towards upstream IAB nodes and as a parent node towards downstream IAB nodes (compare with FIG. 3).

Each IAB node typically holds a distributed unit (DU) function and a mobile terminated (MT) function as mentioned before (see also 6.3.1-1 in TR38.874). The IAB node connects to an upstream IAB node (or the IAB donor node) via the MT, and connects to a downstream IAB node via the DU. The IAB node may also establish radio link channels to UEs via the DU.

In some embodiments, the MT/DU of an IAB node may transmit and/or receive using time-frequency resources that would otherwise be possible to allocate for transmission/reception operations in relation to radio access for UEs.

There might be at least two different types (classes) of IAB nodes; wide area IAB nodes (also referred to as macro-IAB nodes) and local area IAB nodes (also referred to as pico-IAB nodes).

The wide area IAB nodes are similar to radio access nodes, such as base stations and may be deployed by the operator at locations determined by the operator. Typically, the wide area IAB nodes are purchased by an operator and its characteristics are known to the operator. The deployment of a wide area IAB node is typically stationary, planned, and controlled. Consequently, the DU-MT link (i.e., the parent backhaul link) can be expected to be reliable and stationary. From the network perspective, a wide area IAB node behaves like a radio access node (e.g., a base station, BS) of the network and fulfils corresponding requirements.

The local area IAB nodes are—in some senses—similar to a UE in behavior and requirements, and may be deployed without control of an operator. Typically, characteristics of the local area IAB nodes may be unknown to the operator, and the deployment may be non-stationary (or semi-stationary), relatively unplanned, and/or uncontrolled. They can be placed more arbitrarily; by the operator or someone else. Since the behavior of local area IAB nodes cannot be expected to be controllable by the network, these nodes are preferably treated like UEs and should fulfil (most of) the UE requirements (including radio resource management—RRM—requirements).

A macro-IAB node may in effect be a base station without a wired backhaul (e.g., without a fiber connected to it). Hence, it will typically be equipped with more antennas than the pico-IAB node or UE, and may also use a higher transmit power than the pico-IAB node or UE (e.g., when communicating with other IAB nodes, donor nodes, UEs, or other nodes).

The relatively number of antennas and the relatively high transmit power enable IAB to use comparatively higher order modulation and coding schemes (in terms of throughput) compared to the pico-IAB node or UE. This, in combination with stationary deployment (implying a more stationary channel than non-stationary deployment), entails that it is beneficial for an IAB node to obtain highly accurate beamforming settings for use relative its related (also stationary) IAB nodes; more so than for a non-stationary IAB node, and more so than for links relative a non-stationary IAB node or UE. Furthermore, the consequences of a dropped IAB link may be more severe than a dropped radio link to an ordinary UE, since the IAB link may (instead of one UE) potentially serve many UEs and/or any downstream IAB nodes. For any of these and/or other reasons, it may be seen as important to establish a robust IAB link (e.g., one that can survive a dropped beam direction without the entire link being dropped).

Embodiments presented herein aim for beamforming selection that is accurate and robust. It should be noted that such beamforming settings may have arbitrary shape (e.g., emission/combining pattern), and are not necessarily pencil-like.

It should be noted that, although embodiments presented herein are particularly suitable for macro-IAB nodes, embodiments may be equally applicable for pico-IAB nodes and/or other communication nodes (e.g., radio access nodes and/or UEs).

In 3GPP also advocates the concept of new radio (NR), which may be applied in the context of IAB. NR comprises a beamforming setting management framework, which provides signaling and mechanisms to re-evaluate the suitability of transmitter and/or receiver beamforming once an initial beamforming setting pair is established, and adjust the beamforming setting(s) as needed (e.g., due to potential movements of the transmitter and/or receiver, and/or due to changes in the propagation environment). Beamforming adjustment is typically done in isolation at each end of the link according to NR (e.g., the transmitter adjusts transmission beamforming based on the current reception pattern). When beamforming measurements are concluded, the result may be reported to the other end of the link (e.g., using the 3GPP report CSI-ReportConfig).

The beamforming calibration approaches of NR were not primarily designed for the special case of IAB.

For example, the stationary nature of macro-IAB nodes (as well as the relatively stationary nature of pico-IAB nodes; compared to ordinary UEs) allows for a more relaxed beam calibration periodicity. Thus, the beamforming calibration may take place more seldom (possibly entailing decreased signaling overhead). Thereby, it is not necessarily detrimental if the complexity of the beamforming calibration is somewhat increased.

Further, due to the stationary nature, IAB nodes will typically benefit from a more accurate beamforming calibration, and/or enablement of more beamforming options (e.g., multi-pencil—or arbitrary pattern—beamforming settings) in which higher modulation orders and higher code rates are more likely to be achieved.

Furthermore, the need for link robustness is typically more important for IAB nodes due to that (potentially) many more nodes/devices are depending on the IAB link than what is the case for an ordinary radio link. One way of achieving link robustness is to apply beamforming settings wherein one or more suitable redundancy spatial directions are included.

These and/or other issues are addressed by some embodiments presented herein, in the form of an iterative approach for beamforming calibration (i.e., beamforming selection). The iterative approach enables a pair of IAB nodes (parent-child) to accurately calibrate their respective beamforming settings in a joint fashion, while requiring moderate complexity. Thereby, the resulting link will have a built-in beamforming redundancy. The approach is applicable to nodes applying analog beamforming, as well as to nodes applying digital beamforming. Some embodiments are also suitable for beamforming re-calibration (i.e., repeated beamforming selection); e.g., applicable if link conditions change for some reason.

Advantages of some embodiments include—but are not limited to—that the increased accuracy of the beamforming calibration enables increased throughput and/or decreased resource utilization for a given amount of data, that the beamforming with spatial direction redundancy enables increased link robustness even if one or more propagation path is suddenly blocked, and that beamforming re-calibration allows for speedy adjustment to changing conditions (e.g., lost possibility to utilize a beamforming direction).

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a wireless communication node (e.g., a network node, a user equipment—UE—node, an integrated access backhaul—IAB—node, etc.).

Embodiments may appear within an electronic apparatus (such as a wireless communication node) comprising arrangements, circuitry, and/or logic according to any of the embodiments described herein. Alternatively or additionally, an electronic apparatus (such as a wireless communication node) may be configured to perform methods according to any of the embodiments described herein.

Figure 5:
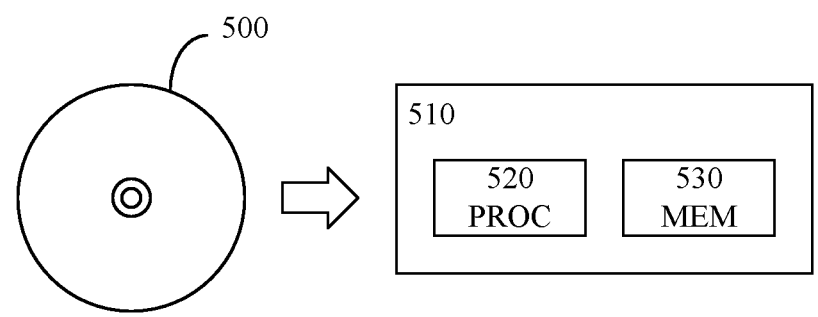
FIG. 5 is a schematic drawing illustrating an example computer readable medium according to some embodiments.

According to some embodiments, a computer program product comprises a tangible, or non-tangible, computer readable medium such as, for example a universal serial bus (USB) memory, a plug-in card, an embedded drive or a read only memory (ROM). FIG. 5 illustrates an example computer readable medium in the form of a compact disc (CD) ROM 500. The computer readable medium has stored thereon a computer program comprising program instructions. The computer program is loadable into a data processor (PROC; e.g., data processing circuitry or a data processing unit) 520, which may, for example, be comprised in a wireless communication node 510. When loaded into the data processor, the computer program may be stored in a memory (MEM) 530 associated with or comprised in the data processor. According to some embodiments, the computer program may, when loaded into and run by the data processor, cause execution of method steps according to, for example, any of the methods as illustrated in FIG. 1 or otherwise described herein.

Figure 6:
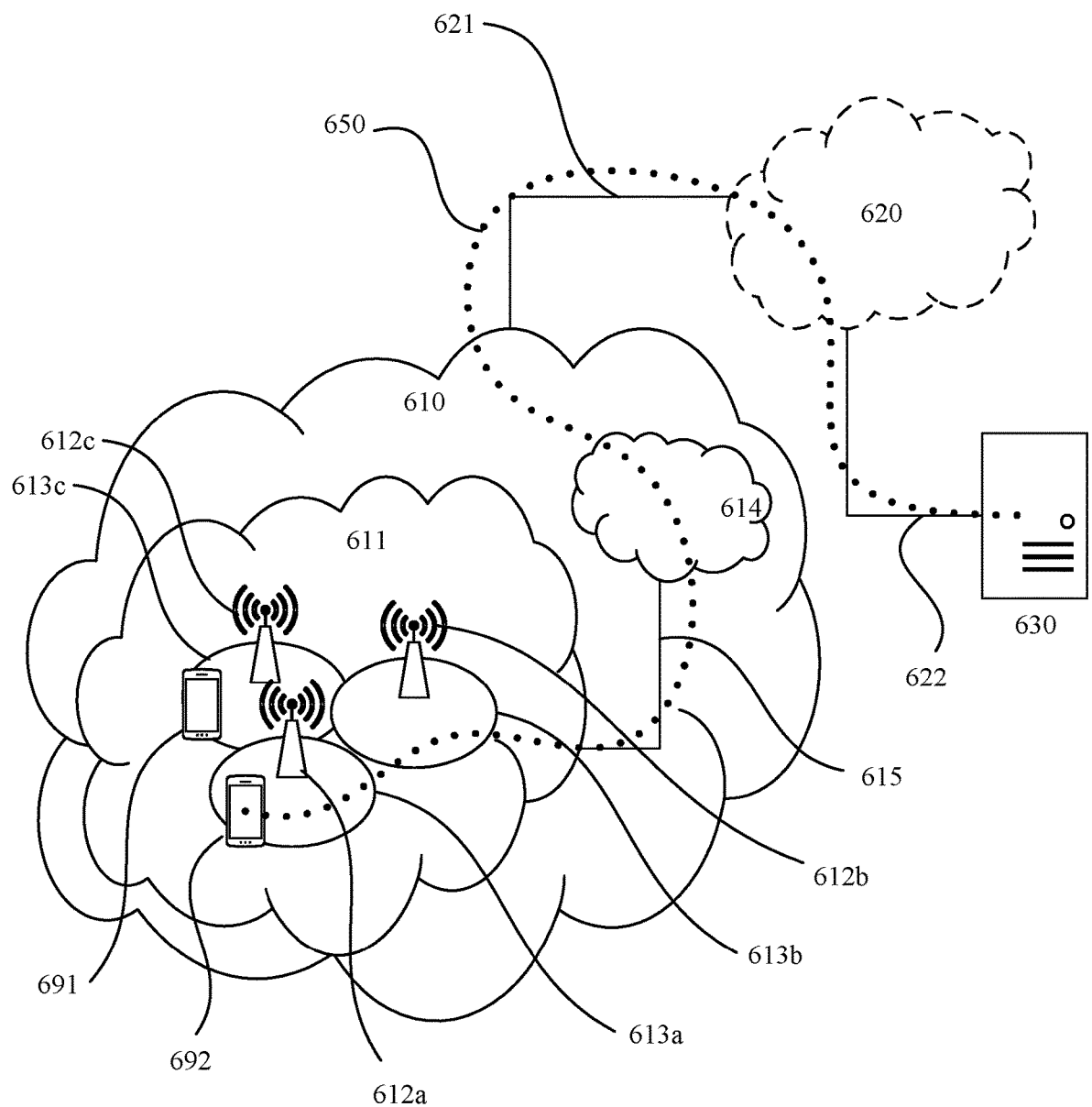
FIG. 6 illustrates a telecommunication network connected via an intermediate network to a host computer in accordance with some embodiments.

With reference to FIG. 6, in accordance with an embodiment, a communication system includes telecommunication network 610, such as a 3GPP-type cellular network, which comprises access network 611, such as a radio access network, and core network 614. Access network 611 comprises a plurality of base stations 612a, 612b, 612c, such as NBs, eNBs, gNBs or other types of wireless access points, each defining a corresponding coverage area 613a, 613b, 613c. Each base station 612a, 612b, 612c is connectable to core network 614 over a wired or wireless connection 615. A first UE 691 located in coverage area 613c is configured to wirelessly connect to, or be paged by, the corresponding base station 612c. A second UE 692 in coverage area 613a is wirelessly connectable to the corresponding base station 612a. While a plurality of UEs 691, 692 are illustrated in this example, the disclosed embodiments are equally applicable to a situation where a sole UE is in the coverage area or where a sole UE is connecting to the corresponding base station 612.

Telecommunication network 610 is itself connected to host computer 630, which may be embodied in the hardware and/or software of a standalone server, a cloud-implemented server, a distributed server or as processing resources in a server farm. Host computer 630 may be under the ownership or control of a service provider, or may be operated by the service provider or on behalf of the service provider. Connections 621 and 622 between telecommunication network 610 and host computer 630 may extend directly from core network 614 to host computer 630 or may go via an optional intermediate network 620. Intermediate network 620 may be one of, or a combination of more than one of, a public, private or hosted network; intermediate network 620, if any, may be a backbone network or the Internet; in particular, intermediate network 620 may comprise two or more subnetworks (not shown).

The communication system of FIG. 6 as a whole enables connectivity between the connected UEs 691, 692 and host computer 630. The connectivity may be described as an over-the-top (OTT) connection 650. Host computer 630 and the connected UEs 691, 692 are configured to communicate data and/or signaling via OTT connection 650, using access network 611, core network 614, any intermediate network 620 and possible further infrastructure (not shown) as intermediaries. OTT connection 650 may be transparent in the sense that the participating communication devices through which OTT connection 650 passes are unaware of routing of uplink and downlink communications. For example, base station 612 may not or need not be informed about the past routing of an incoming downlink communication with data originating from host computer 630 to be forwarded (e.g., handed over) to a connected UE 691. Similarly, base station 612 need not be aware of the future routing of an outgoing uplink communication originating from the UE 691 towards the host computer 630.

Example implementations, in accordance with an embodiment, of the UE, base station and host computer discussed in the preceding paragraphs will now be described with reference to FIG. 7. In communication system 700, host computer 710 comprises hardware 715 including communication interface 716 configured to set up and maintain a wired or wireless connection with an interface of a different communication device of communication system 700. Host computer 710 further comprises processing circuitry 718, which may have storage and/or processing capabilities. In particular, processing circuitry 718 may comprise one or more programmable processors, application-specific integrated circuits, field programmable gate arrays or combinations of these (not shown) adapted to execute instructions. Host computer 710 further comprises software 711, which is stored in or accessible by host computer 710 and executable by processing circuitry 718. Software 711 includes host application 712. Host application 712 may be operable to provide a service to a remote user, such as UE 730 connecting via OTT connection 750 terminating at UE 730 and host computer 710. In providing the service to the remote user, host application 712 may provide user data which is transmitted using OTT connection 750.

Communication system 700 further includes base station 720 provided in a telecommunication system and comprising hardware 725 enabling it to communicate with host computer 710 and with UE 730. Hardware 725 may include communication interface 726 for setting up and maintaining a wired or wireless connection with an interface of a different communication device of communication system 700, as well as radio interface 727 for setting up and maintaining at least wireless connection 770 with UE 730 located in a coverage area (not shown in FIG. 7) served by base station 720. Communication interface 726 may be configured to facilitate connection 760 to host computer 710. Connection 760 may be direct or it may pass through a core network (not shown in FIG. 7) of the telecommunication system and/or through one or more intermediate networks outside the telecommunication system. In the embodiment shown, hardware 725 of base station 720 further includes processing circuitry 728, which may comprise one or more programmable processors, application-specific integrated circuits, field programmable gate arrays or combinations of these (not shown) adapted to execute instructions. Base station 720 further has software 721 stored internally or accessible via an external connection.

Communication system 700 further includes UE 730 already referred to. Its hardware 735 may include radio interface 737 configured to set up and maintain wireless connection 770 with a base station serving a coverage area in which UE 730 is currently located. Hardware 735 of UE 730 further includes processing circuitry 738, which may comprise one or more programmable processors, application-specific integrated circuits, field programmable gate arrays or combinations of these (not shown) adapted to execute instructions. UE 730 further comprises software 731, which is stored in or accessible by UE 730 and executable by processing circuitry 738. Software 731 includes client application 732. Client application 732 may be operable to provide a service to a human or non-human user via UE 730, with the support of host computer 710. In host computer 710, an executing host application 712 may communicate with the executing client application 732 via OTT connection 750 terminating at UE 730 and host computer 710. In providing the service to the user, client application 732 may receive request data from host application 712 and provide user data in response to the request data. OTT connection 750 may transfer both the request data and the user data. Client application 732 may interact with the user to generate the user data that it provides.

Figure 7:
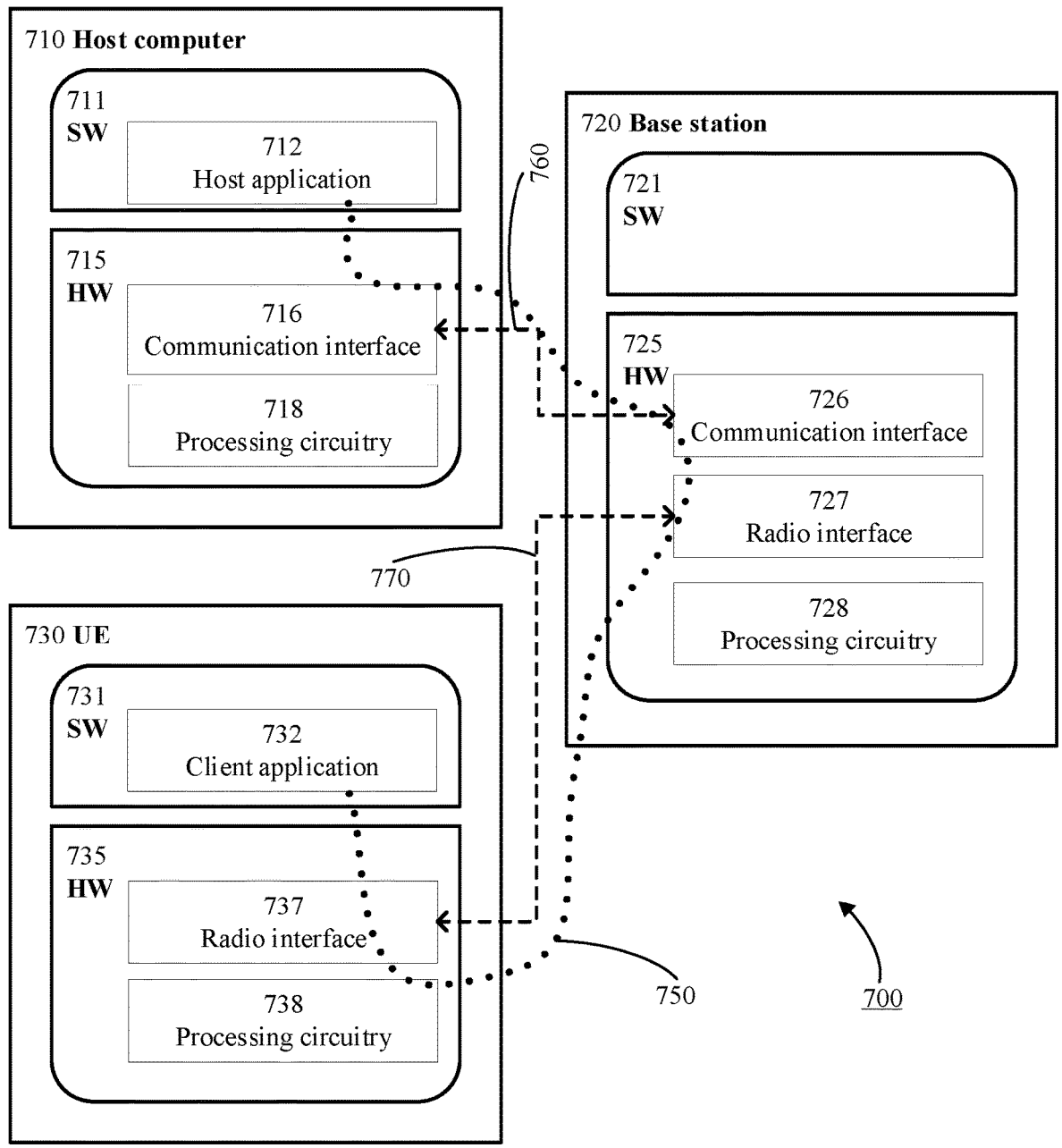
FIG. 7 illustrates a host computer communicating via a base station with a user equipment over a partially wireless connection in accordance with some embodiments.

It is noted that host computer 710, base station 720 and UE 730 illustrated in FIG. 7 may be similar or identical to host computer 630, one of base stations 612a, 612b, 612c and one of UEs 691, 692 of FIG. 6, respectively. This is to say, the inner workings of these entities may be as shown in FIG. 7 and independently, the surrounding network topology may be that of FIG. 6.

In FIG. 7, OTT connection 750 has been drawn abstractly to illustrate the communication between host computer 710 and UE 730 via base station 720, without explicit reference to any intermediary devices and the precise routing of messages via these devices. Network infrastructure may determine the routing, which it may be configured to hide from UE 730 or from the service provider operating host computer 710, or both. While OTT connection 750 is active, the network infrastructure may further take decisions by which it dynamically changes the routing (e.g., on the basis of load balancing consideration or reconfiguration of the network).

Wireless connection 770 between UE 730 and base station 720 is in accordance with the teachings of the embodiments described throughout this disclosure. One or more of the various embodiments improve the performance of OTT services provided to UE 730 using OTT connection 750, in which wireless connection 770 forms the last segment. More precisely, the teachings of these embodiments may improve one or more of: beamforming selection accuracy, beamforming selection robustness, and beamforming selection overhead, and thereby provide benefits such as improved communication efficiency (e.g., in terms of one or more of: throughput, capacity, link failure, etc.).

A measurement procedure may be provided for the purpose of monitoring data rate, latency and other factors on which the one or more embodiments improve. There may further be an optional network functionality for reconfiguring OTT connection 750 between host computer 710 and UE 730, in response to variations in the measurement results. The measurement procedure and/or the network functionality for reconfiguring OTT connection 750 may be implemented in software 711 and hardware 715 of host computer 710 or in software 731 and hardware 735 of UE 730, or both. In embodiments, sensors (not shown) may be deployed in or in association with communication devices through which OTT connection 750 passes; the sensors may participate in the measurement procedure by supplying values of the monitored quantities exemplified above, or supplying values of other physical quantities from which software 711, 731 may compute or estimate the monitored quantities. The reconfiguring of OTT connection 750 may include message format, retransmission settings, preferred routing etc.; the reconfiguring need not affect base station 720, and it may be unknown or imperceptible to base station 720. Such procedures and functionalities may be known and practiced in the art. In certain embodiments, measurements may involve proprietary UE signaling facilitating host computer 710's measurements of throughput, propagation times, latency and the like. The measurements may be implemented in that software 711 and 731 causes messages to be transmitted, in particular empty or 'dummy' messages, using OTT connection 750 while it monitors propagation times, errors etc.

Figure 8:
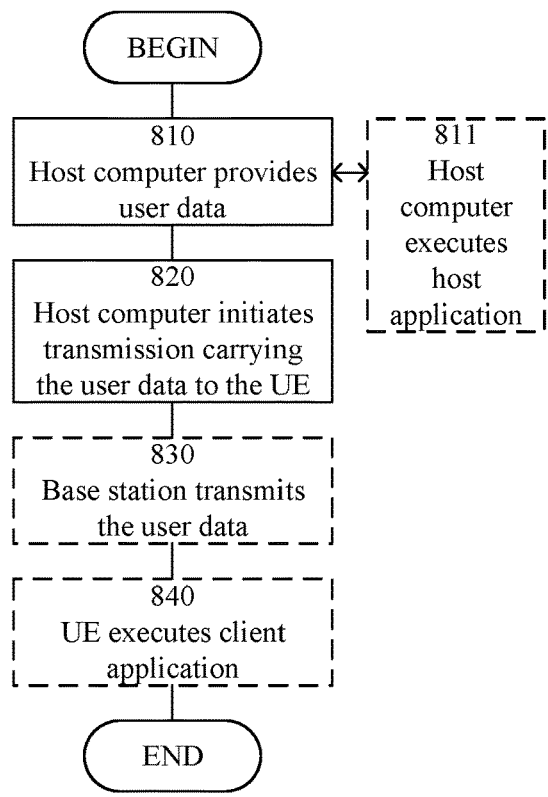
FIG. 8 is a flowchart illustrating example method steps implemented in a communication system including a host computer, a base station and a user equipment in accordance with some embodiments.

FIG. 8 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 8 will be included in this section. In step 810, the host computer provides user data. In substep 811 (which may be optional) of step 810, the host computer provides the user data by executing a host application. In step 820, the host computer initiates a transmission carrying the user data to the UE. In step 830 (which may be optional), the base station transmits to the UE the user data which was carried in the transmission that the host computer initiated, in accordance with the teachings of the embodiments described throughout this disclosure. In step 840 (which may also be optional), the UE executes a client application associated with the host application executed by the host computer.

Figure 9:
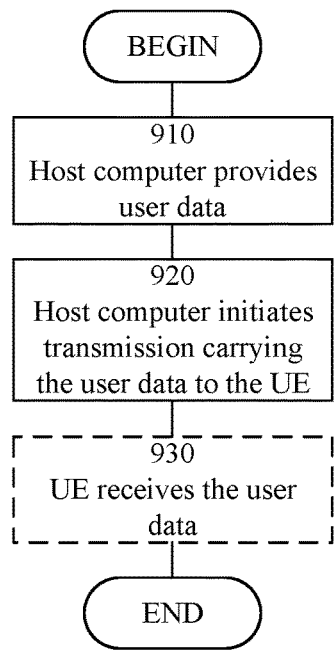
FIG. 9 is a flowchart illustrating example method steps implemented in a communication system including a host computer, a base station and a user equipment in accordance with some embodiments.

FIG. 9 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 9 will be included in this section. In step 910 of the method, the host computer provides user data. In an optional substep (not shown) the host computer provides the user data by executing a host application. In step 920, the host computer initiates a transmission carrying the user data to the UE. The transmission may pass via the base station, in accordance with the teachings of the embodiments described throughout this disclosure. In step 930 (which may be optional), the UE receives the user data carried in the transmission.

Figure 10:
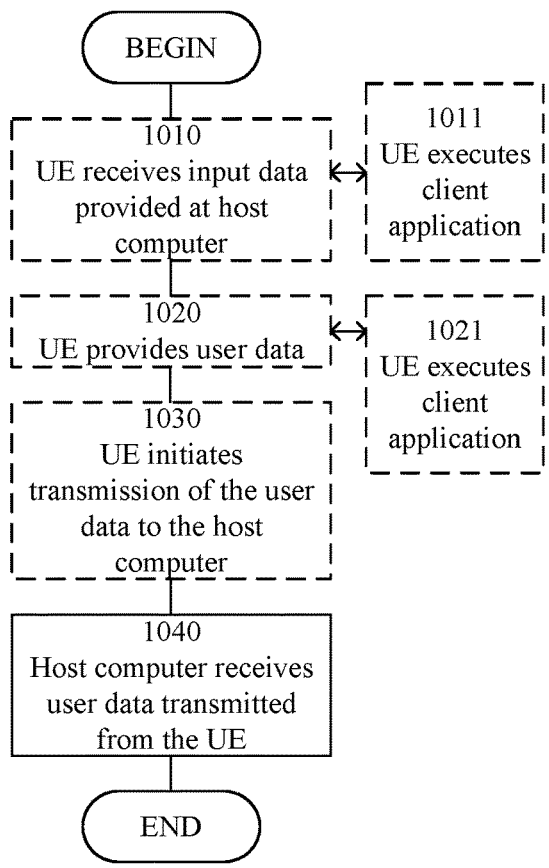
FIG. 10 is a flowchart illustrating example method steps implemented in a communication system including a host computer, a base station and a user equipment in accordance with some embodiments.

FIG. 10 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 10 will be included in this section. In step 1010 (which may be optional), the UE receives input data provided by the host computer. Additionally or alternatively, in step 1020, the UE provides user data. In substep 1021 (which may be optional) of step 1020, the UE provides the user data by executing a client application. In substep 1011 (which may be optional) of step 1010, the UE executes a client application which provides the user data in reaction to the received input data provided by the host computer. In providing the user data, the executed client application may further consider user input received from the user. Regardless of the specific manner in which the user data was provided, the UE initiates, in substep 1030 (which may be optional), transmission of the user data to the host computer. In step 1040 of the method, the host computer receives the user data transmitted from the UE, in accordance with the teachings of the embodiments described throughout this disclosure.

Figure 11:
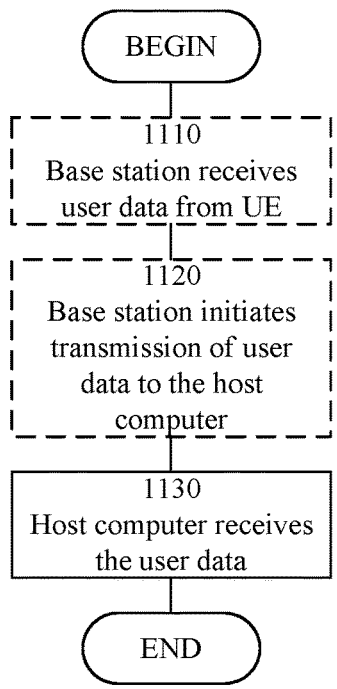
FIG. 11 is a flowchart illustrating example method steps implemented in a communication system including a host computer, a base station and a user equipment in accordance with some embodiments.

FIG. 11 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 11 will be included in this section. In step 1110 (which may be optional), in accordance with the teachings of the embodiments described throughout this disclosure, the base station receives user data from the UE. In step 1120 (which may be optional), the base station initiates transmission of the received user data to the host computer. In step 1130 (which may be optional), the host computer receives the user data carried in the transmission initiated by the base station.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

EXAMPLE EMBODIMENTS

Group A Embodiments

A1. A method performed by a wireless device for beamforming selection, the method comprising:
receiving first reference signaling, transmitted from a second wireless communication node using a first beamforming setting;
generating a first channel estimate based on the first reference signaling; and
transmitting, using a second beamforming setting, second reference signaling for reception by the second wireless communication node, wherein each coefficient of the second beamforming setting represents a complex conjugate of a corresponding component of the first channel estimate.

A2. The method of any of the previous embodiments in Group A, further comprising:
providing user data; and
forwarding the user data to a host computer via the transmission to the base station.

Group B Embodiments

B1. A method performed by a base station for beamforming selection, the method comprising:
receiving first reference signaling, transmitted from a second wireless communication node using a first beamforming setting;
generating a first channel estimate based on the first reference signaling; and
transmitting, using a second beamforming setting, second reference signaling for reception by the second wireless communication node, wherein each coefficient of the second beamforming setting represents a complex conjugate of a corresponding component of the first channel estimate.

B2. The method of any of the previous embodiments in Group B, further comprising:
obtaining user data; and
forwarding the user data to a host computer or a wireless device.

Group C Embodiments

C1. A wireless device for beamforming selection, the wireless device comprising:
processing circuitry configured to perform any of the steps of any of the Group A embodiments; and
power supply circuitry configured to supply power to the wireless device.

C2. A base station for beamforming selection, the base station comprising:
processing circuitry configured to perform any of the steps of any of the Group B embodiments;
power supply circuitry configured to supply power to the base station.

C3. A user equipment (UE) for beamforming selection, the UE comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

Group D Embodiments

D1. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps described for the Group B embodiments.

D2. The communication system of embodiment D1 further including the base station.

D3. The communication system of any of embodiments D1 through D2, further including the UE, wherein the UE is configured to communicate with the base station.

D4. The communication system of any of embodiments D1 through D3, wherein:
the processing circuitry of the host computer is configured to execute a host application, thereby providing the user data; and
the UE comprises processing circuitry configured to execute a client application associated with the host application.

D5. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps described for the Group B embodiments.

D6. The method of embodiment D5, further comprising, at the base station, transmitting the user data.

D7. The method of any of embodiments D5 through D6, wherein the user data is provided at the host computer by executing a host application, the method further comprising, at the UE, executing a client application associated with the host application.

D8. A user equipment (UE) configured to communicate with a base station, the UE comprising a radio interface and processing circuitry configured to perform the method of any of embodiments D5 through D7.

D9. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps described for the Group A embodiments.

D10. The communication system of embodiment D9, wherein the cellular network further includes a base station configured to communicate with the UE.

D11. The communication system of any of embodiments D9 through D10, wherein:
the processing circuitry of the host computer is configured to execute a host application, thereby providing the user data; and
the UE's processing circuitry is configured to execute a client application associated with the host application.

D12. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps described for the Group A embodiments.

D13. The method of embodiment D12, further comprising at the UE, receiving the user data from the base station.

D14. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps described for the Group A embodiments.

D15. The communication system of embodiment D14, further including the UE.

D16. The communication system of any of embodiments D14 through D15, further including the base station, wherein the base station comprises a radio interface configured to communicate with the UE and a communication interface configured to forward to the host computer the user data carried by a transmission from the UE to the base station.

D17. The communication system of any of embodiments D14 through D16, wherein:
the processing circuitry of the host computer is configured to execute a host application; and
the UE's processing circuitry is configured to execute a client application associated with the host application, thereby providing the user data.

D18. The communication system of any of embodiments D14 through D17, wherein:
the processing circuitry of the host computer is configured to execute a host application, thereby providing request data; and
the UE's processing circuitry is configured to execute a client application associated with the host application, thereby providing the user data in response to the request data.

D19. A method implemented in a communication system including a host computer, a base station and a user equipment (UE), the method comprising:
at the host computer, receiving user data transmitted to the base station from the UE, wherein the UE performs any of the steps described for the Group A embodiments.

D20. The method of embodiment D19, further comprising, at the UE, providing the user data to the base station.

D21. The method of any of embodiments D19 through D20, further comprising:
at the UE, executing a client application, thereby providing the user data to be transmitted; and
at the host computer, executing a host application associated with the client application.

D22. The method of any of embodiments D19 through D21, further comprising:
at the UE, executing a client application; and
at the UE, receiving input data to the client application, the input data being provided at the host computer by executing a host application associated with the client application,
wherein the user data to be transmitted is provided by the client application in response to the input data.

D23. A user equipment (UE) configured to communicate with a base station, the UE comprising a radio interface and processing circuitry configured to perform the method of any of embodiments D19 through D22.

D24. A communication system including a host computer comprising a communication interface configured to receive user data originating from a transmission from a user equipment (UE) to a base station, wherein the base station comprises a radio interface and processing circuitry, the base station's processing circuitry configured to perform any of the steps described for the Group B embodiments.

D25. The communication system of embodiment D24 further including the base station.

D26. The communication system of any of embodiments D24 through D25, further including the UE, wherein the UE is configured to communicate with the base station.

D27. The communication system of any of embodiments D24 through D25, wherein:
the processing circuitry of the host computer is configured to execute a host application;
the UE is configured to execute a client application associated with the host application, thereby providing the user data to be received by the host computer.

D28. A method implemented in a communication system including a host computer, a base station and a user equipment (UE), the method comprising:
at the host computer, receiving, from the base station, user data originating from a transmission which the base station has received from the UE, wherein the UE performs any of the steps described for the Group A embodiments.

D29. The method of embodiment D28, further comprising at the base station, receiving the user data from the UE.

D30. The method of any of embodiments D28 through D29, further comprising at the base station, initiating a transmission of the received user data to the host computer.

D31. A method implemented in a communication system including a host computer, a base station and a user equipment (UE), the method comprising:
at the host computer, receiving, from the base station, user data originating from a transmission which the base station has received from the UE, wherein the base station performs any of the steps described for the Group B embodiments.

D32. The method of embodiment D31, further comprising at the base station, receiving the user data from the UE.

D33. The method of any of embodiments D31 through D32, further comprising at the base station, initiating a transmission of the received user data to the host computer.

The invention claimed is:

1. A beamforming selection method of a first wireless communication node, the method comprising:
receiving first reference signaling, transmitted from a second wireless communication node using a first beamforming setting;
generating a first channel estimate based on the first reference signaling;
transmitting, using a second beamforming setting, second reference signaling for reception by the second wireless communication node, wherein each coefficient of the second beamforming setting represents a complex conjugate of a corresponding component of the first channel estimate; and
receiving final reference signaling, transmitted from the second wireless communication node;
generating a final channel estimate based on the final reference signaling; and
selecting a beamforming setting for communication, wherein each coefficient of the selected beamforming setting for communication represents a complex conjugate of a corresponding component of the final channel estimate.

2. The method of claim 1, further comprising:
receiving third reference signaling, transmitted from the second wireless communication node using a third beamforming setting, wherein each coefficient of the third beamforming setting represents a complex conjugate of a corresponding component of a second channel estimate generated based on the second reference signaling as received by the second wireless communication node;
generating a third channel estimate based on the third reference signaling; and
transmitting, using a fourth beamforming setting, fourth reference signaling for reception by the second wireless communication node, wherein each coefficient of the fourth beamforming setting represents a complex conjugate of a corresponding component of the third channel estimate.

3. The method of claim 1, further comprising:
determining whether a stopping criterion is met; and
iterating, until the stopping criterion is met:
receiving further reference signaling, transmitted from the second wireless communication node using a further beamforming setting, wherein each coefficient of the further beamforming setting represents a complex conjugate of a corresponding component of a channel estimate generated based on previously transmitted reference signaling as received by the second wireless communication node;
generating a further channel estimate based on the further reference signaling; and
transmitting, using an updated beamforming setting, updated reference signaling for reception by the second wireless communication node, wherein each coefficient of the updated beamforming setting represents a complex conjugate of a corresponding component of the further channel estimate.

4. The method of claim 3, wherein the stopping criterion comprises one or more of:
that a number of iterations performed equals a maximum number of iterations; and
that a beamforming convergence criterion is met.

5. The method of claim 1, further comprising transmitting, using a seed beamforming setting, initial reference signaling for reception by the second wireless communication node, wherein receiving the first reference signaling is responsive to transmitting the initial reference signaling and wherein each coefficient of the first beamforming setting represents a complex conjugate of a corresponding component of an initial channel estimate generated based on the initial reference signaling as received by the second wireless communication node.

6. The method of claim 5, wherein the seed beamforming setting comprises one or more of:
a beamforming setting previously selected for communication;
a randomly selected beamforming setting; and
a default beamforming setting.

7. The method of claim 1, further comprising temporarily using a most recent beamforming setting for communication.

8. The method of claim 1, further comprising triggering a process comprising the steps of receiving and transmitting reference signaling.

9. The method of claim 8, wherein the triggering is responsive to detecting that a trigger condition is met, wherein the trigger condition comprises one or more of:

that a predetermined time duration has elapsed since a previous beamforming selection;

that a predetermined point in time for beamforming selection occurs;

that a signal quality metric change is indicative of reducing signal quality; and that a signal quality metric falls below a signal quality metric threshold.

10. The method of claim 8, wherein triggering the process comprises transmitting and/or receiving, to/from the second wireless communication node, one or more of:

a beamforming selection request message;

a beamforming selection grant message;

an indication of a number of antenna elements of the first wireless communication node, and/or an indication of a number of antenna elements of the second wireless communication node;

an indication of whether the first wireless communication node applies analog or digital beamforming, and/or an indication of whether the second wireless communication node applies analog or digital beamforming; and one or more stopping criteria particulars.

11. The method of claim 1, wherein reference signaling reception is omnidirectional.

12. The method of claim 1, wherein reference signaling transmission using a beamforming setting of the first wireless communication node comprises:

when the second wireless communication node applies digital beamforming, a single occurrence of reference signaling transmission using the beamforming setting of the first wireless communication node; and when the second wireless communication node applies analog beamforming, a plurality of occurrences of reference signaling transmissions using the beamforming setting of the first wireless communication node.

13. The method of claim 1, wherein the first wireless communication node applies analog beamforming, and wherein reference signaling reception for a beamforming setting of the second wireless communication node comprises:

receiving reference signaling at a plurality of occurrences, the reference signaling transmitted using the beamforming setting of the second wireless communication node; and transforming the reference signaling received at the plurality of occurrences and/or channel estimates generated based on the reference signaling received at the plurality of occurrences, wherein transforming is based on a representation of a grid of reception beams applied by the first wireless communication node during the plurality of occurrences.

14. The method of claim 1, wherein the first wireless communication node applies analog beamforming, and wherein reference signaling transmission using a beamforming setting of the first wireless communication node comprises magnitude truncation of the beamforming setting.

15. The method of claim 1, wherein the first wireless communication node applies digital beamforming, and wherein reference signaling reception for a beamforming setting of the second wireless communication node comprises:

receiving reference signaling at a single occurrence, the reference signaling transmitted using the beamforming setting of the second wireless communication node.

16. The method of claim 1, wherein channel estimate generation based on reference signaling comprises interference mitigation.

17. The method of claim 1, wherein the first and second wireless communication nodes are integrated access backhaul, IAB, nodes.

18. The method of claim 1, wherein the first wireless communication node acts as a parent node and the method is performed by a distributed unit, DU, functionality of the first wireless communication node.

19. The method of claim 1, wherein the first wireless communication node acts as a child node and the method is performed by a mobile terminated, MT, functionality of the first wireless communication node.

* * * * *